US012785594B2

(12) United States Patent
Xu et al.

(10) Patent No.: US 12,785,594 B2
(45) Date of Patent: Nov. 3, 2026

(54) POWER TOOL AND CONTROL METHOD THEREOF

(71) Applicant: Nanjing Chervon Industry Co., Ltd., Nanjing (CN)

(72) Inventors: Tianxiao Xu, Nanjing (CN); Xianjing Shao, Nanjing (CN); Hailong Wang, Nanjing (CN); Yuanyuan Shen, Nanjing (CN); Qing Gao, Nanjing (CN); Xiaobo Yu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/229,324

(22) Filed: Jun. 5, 2025

(65) Prior Publication Data

US 2025/0300582 A1 Sep. 25, 2025

Related U.S. Application Data

(63) Continuation of application No. PCT/CN2023/140986, filed on Dec. 22, 2023.

(30) Foreign Application Priority Data

Dec. 27, 2022 (CN) ......................... 202211683061.3
Nov. 30, 2023 (CN) ......................... 202311635608.7

(51) Int. Cl.
*H02P 6/21* (2016.01)
*B24B 23/02* (2006.01)
(Continued)

(52) U.S. Cl.
CPC ................ *H02P 6/21* (2016.02); *B24B 23/02* (2013.01); *H02P 6/06* (2013.01); *H02P 6/24* (2013.01); *H02P 6/28* (2016.02)

(58) Field of Classification Search
CPC ......... B25F 5/00; B24B 23/02; B24B 23/028; H02P 6/06; H02P 6/18
See application file for complete search history.

(56) References Cited

U.S. PATENT DOCUMENTS 6,034,493 A * 3/2000 Boyd ......................... H02P 6/15 318/400.31
7,202,623 B2 * 4/2007 Zhou ......................... H02P 6/22 318/434
(Continued)

FOREIGN PATENT DOCUMENTS

CN 109995298 B 11/2020
CN 113364368 A 9/2021
(Continued)

OTHER PUBLICATIONS

Gong Jian et al., Brushless DC Motor Starting Based on High Precision Inductance Method and Study on the Stability of BEMF Synchronous Detection, Transactions of China Electrotechnical Society, vol. 32, No. 05, Mar. 10, 2017, Abstract only translated.
(Continued)

*Primary Examiner* — Andrew M Tecco
*Assistant Examiner* — Nicholas E Igbokwe
(74) *Attorney, Agent, or Firm* — Greenberg Traurig, LLP

(57) ABSTRACT

A power tool includes an electric motor, a power supply module, a driver circuit, a control module, and a detection module. Under sensorless control, the power tool can accurately identify an occasion for controlling a brushless motor to switch from an open-loop control mode to a closed-loop control mode.

20 Claims, 10 Drawing Sheets

(51) Int. Cl.
*H02P 6/06* (2006.01)
*H02P 6/24* (2006.01)
*H02P 6/28* (2016.01)

(56) References Cited

U.S. PATENT DOCUMENTS

| | | | | |
|---|---|---|---|---|
| 7,965,053 | B2 * | 6/2011 | Borisavljevic | G01P 3/48 318/400.31 |
| 2016/0276966 | A1 | 9/2016 | Tian | |
| 2017/0234484 | A1 * | 8/2017 | Vanko | B24B 23/028 173/176 |
| 2018/0274249 | A1 | 9/2018 | Hayman | |
| 2020/0389109 | A1 * | 12/2020 | Yajurvedi | H02P 6/181 |
| 2020/0389110 | A1 * | 12/2020 | Yajurvedi | H02P 6/181 |
| 2021/0194320 | A1 * | 6/2021 | Smith | H02K 1/2733 |
| 2022/0115966 | A1 | 4/2022 | Xu | |

FOREIGN PATENT DOCUMENTS

| | | | |
|---|---|---|---|
| CN | 114553070 | A | 5/2022 |
| CN | 115360939 | A | 11/2022 |

OTHER PUBLICATIONS

International Search Report and Written Opinion of application No. PCT/CN23/140986, mailed Mar. 4, 2024, 14 pp.

* cited by examiner

POWER TOOL AND CONTROL METHOD THEREOF

RELATED APPLICATION INFORMATION

This application is a continuation of International Application Number PCT/CN2023/140986, filed on Dec. 22, 2023, through which this application also claims the benefit under 35 U.S.C. § 119(a) of Chinese Patent Application No. CN 202211683061.3, filed on Dec. 27, 2022, and Chinese Patent Application No. CN202311635608.7, filed on Nov. 30, 2023, which application are incorporated herein by reference in their entireties.

TECHNICAL FIELD

The present application relates to the field of tools and, in particular, to a power tool and a control method of a power tool.

BACKGROUND

Direct current brushless motors are widely applied in the field of power tools due to their energy saving, low noise, compact structures, long service lives, and other characteristics. Typically, a direct current brushless motor generally uses a position sensor to determine the position of the rotor. However, the use of the position sensor not only increases the application cost and increases the complexity of an electric motor production process, but also reduces the reliability and anti-interference capability of a system. Therefore, brushless direct current motors without position sensors start to be used in the field of power tools. A direct current brushless motor without a position sensor is typically applied to a high-speed product with a low load. If applied to a high-voltage direct current (HDVC) angle grinder, the electric motor may generate a relatively high current spike or even be demagnetized due to an excessive load.

High-voltage brushless motors are increasingly popular in the field of power tools, especially in the field of heavy-load power tools, due to their high power and small volumes. A high-voltage brushless motor is powered by utility power instead of a direct current battery pack. The high-voltage brushless motor uses a semiconductor switching device to implement electronic commutation. That is, a traditional contact commutator and an electric brush are replaced by an electronic switching device. The high-voltage brushless motor has the advantages of high reliability, no commutation spark, low mechanical noise, and the like and is widely applied to various power tools. When the load of a power tool is relatively large, the power tool needs a feedback mechanism to remind a user to remove the load. Otherwise, irreversible damage to the electric motor may be caused.

This part provides background information related to the present application, and the background information is not necessarily the related art.

SUMMARY

In a first aspect of the present application, a power tool is provided. The power tool includes an electric motor, a power supply module, a driver circuit, a control module, and a detection module. The electric motor includes a rotor and multi-phase stator windings, where the electric motor is a sensorless brushless motor. The power supply module includes a power supply configured to supply power to the electric motor. The driver circuit is electrically connected to the electric motor and the power supply module and is configured to apply a voltage of the power supply module to the electric motor. The control module is electrically connected to the driver circuit and is configured to output a control signal to the driver circuit to control the driver circuit. The detection module is electrically connected to the multi-phase stator windings and is configured to detect an electrical parameter of each of the multi-phase stator windings during the operation of the electric motor. The electric motor has an unenergized coasting state in an open-loop control mode, and the detection module detects an electrical parameter of each of the multi-phase stator windings of the electric motor in the coasting state. The control module is configured to control the electric motor to switch from the open-loop control mode to a closed-loop control mode when the electrical parameter detected by the detection module reaches a preset electrical parameter value.

In some examples, a duty cycle of the electric motor and a rotational speed of the electric motor in the open-loop control mode are less than a duty cycle of the electric motor and a rotational speed of the electric motor in the closed-loop control mode.

In some examples, in the open-loop control mode, the electric motor has a driving state and a coasting state, where in the driving state, the control module controls the power supply to supply power to the multi-phase stator windings, and in the coasting state, the control module controls the power supply to stop supplying power to the multi-phase stator windings.

In some examples, the electrical parameter is a voltage or a current or a slope of a voltage and/or a derivative of a voltage.

In some examples, the control module is configured to output a control signal with a preset duty cycle at a preset frequency to control the multi-phase stator windings to perform conduction and commutation in a preset commutation sequence.

In some examples, the power supply is a battery pack.

In some examples, the power supply is an alternating current, and the driver circuit further includes a rectifier module configured to convert the alternating current into a direct current.

In some examples, the control module is configured to: acquire a present load parameter of the electric motor when the electric motor operates in a first mode; and control the electric motor to operate in a second mode and control a duty cycle of a pulse-width modulation (PWM) signal to decrease to a first duty cycle when the present load parameter meets a first condition, where the first duty cycle is less than or equal to a preset duty cycle, and the preset duty cycle is the minimum duty cycle of the pulse-width modulation signal in the second mode.

In some examples, a present load parameter includes a present rotational speed or a present current, where when the present load parameter includes the present rotational speed, a first condition includes the condition that the present rotational speed is less than a first rotational speed, and when the present load parameter includes the present current, a first condition includes the condition that the present current is greater than a first current.

In some examples, the control module is further configured to: increase a duty cycle of a pulse-width modulation signal at a first preset rate after the duty cycle of the pulse-width modulation signal is controlled to decrease to a first duty cycle; and control the duty cycle of the pulse-width modulation signal to decrease to a second duty cycle when a present load parameter meets a second condition.

In some examples, the control module is further configured to control the electric motor to operate in a first mode when the present load parameter does not meet the second condition.

In some examples, the present load parameter includes a present rotational speed and/or a present current, where when the present load parameter includes the present rotational speed, the second condition includes the condition that the present rotational speed is less than or equal to a second rotational speed, and when the present load parameter includes the present current, the second condition includes the condition that the present current is greater than or equal to a second current.

In some examples, the control module is further configured to: increase the duty cycle of the pulse-width modulation signal at a second preset rate after the duty cycle of the pulse-width modulation signal is controlled to decrease to the second duty cycle; and control the electric motor to enter a forced commutation state when the present load parameter meets a third condition and self-commutation of the electric motor is not detected within a preset period.

In some examples, the control module is further configured to control the electric motor to operate in a first mode when the present load parameter does not meet the third condition.

In some examples, the present load parameter includes a present rotational speed and/or a present current, where when the present load parameter includes the present rotational speed, the third condition includes the condition that the present rotational speed is less than a third rotational speed, and when the present load parameter includes the present current, the third condition includes the condition that the present current is greater than or equal to a third current.

In a second aspect of the present application, a power tool is provided. The power tool includes an electric motor, a power supply module, a driver circuit, a control module, and a detection module. The electric motor includes a rotor and multi-phase stator windings, where the electric motor is a sensorless brushless motor. The power supply module includes a power supply configured to supply power to the electric motor. The driver circuit is electrically connected to the electric motor and the power supply module and is configured to apply a voltage of the power supply module to the electric motor. The control module is electrically connected to the driver circuit and is configured to output a control signal to the driver circuit to control the driver circuit. The detection module is electrically connected to the multi-phase stator windings and is configured to detect an electrical parameter of each of the multi-phase stator windings during the operation of the electric motor. The detection module is configured to: detect a terminal voltage of a stator winding that is connected to the power supply and define the terminal voltage as a modulation terminal voltage; and detect a terminal voltage of a stator winding that is not connected to the power supply and define the terminal voltage as a floating terminal voltage. The control module is configured to control the electric motor to switch from an open-loop control mode to a closed-loop control mode when variation amplitudes and trends of the modulation terminal voltage and the floating terminal voltage meet preset conditions.

In some examples, the control module is configured to output a control signal with a preset duty cycle at a preset frequency to control the multi-phase stator windings to perform conduction and commutation in a preset commutation sequence.

In some examples, the control module is configured to: acquire a present load parameter of the electric motor when the electric motor operates in a first mode; and control the electric motor to operate in a second mode and control a duty cycle of a pulse-width modulation signal to decrease to a first duty cycle when the present load parameter meets a first condition, where the first duty cycle is less than or equal to a preset duty cycle, and the preset duty cycle is the minimum duty cycle of the pulse-width modulation signal in the second mode.

In some examples, the control module is further configured to: increase the duty cycle of the pulse-width modulation signal at a first preset rate after the duty cycle of the pulse-width modulation signal is controlled to decrease to the first duty cycle; and control the duty cycle of the pulse-width modulation signal to decrease to a second duty cycle when the present load parameter meets a second condition.

In a third aspect of the present application, a control method of a power tool is provided. The power tool includes an electric motor, a power supply module, a driver circuit, a control module, and a detection module. The electric motor includes a rotor and multi-phase stator windings, where the electric motor is a sensorless brushless motor. The power supply module includes a power supply configured to supply power to the electric motor. The driver circuit is electrically connected to the electric motor and the power supply module and is configured to apply a voltage of the power supply module to the electric motor. The control module is electrically connected to the driver circuit and is configured to output a control signal to the driver circuit to control the driver circuit. The detection module is electrically connected to the multi-phase stator windings and is configured to detect an electrical parameter of each of the multi-phase stator windings during the operation of the electric motor. The control method includes: controlling the electric motor to enter an open-loop control mode when a start signal is detected; detecting, in the open-loop control mode, the electrical parameter of each of the multi-phase stator windings of the electric motor in an unenergized coasting state; and controlling the electric motor to switch from the open-loop control mode to a closed-loop control mode when the electrical parameter reaches a threshold of a preset electrical parameter.

In some examples, when the electric motor operates in a first mode, a present load parameter of the electric motor is acquired; it is determined whether the present load parameter meets a first condition; and when the present load parameter meets the first condition, the electric motor is controlled to operate in a second mode, and a duty cycle of a pulse-width modulation signal is controlled to decrease to a first duty cycle, where the first duty cycle is less than or equal to a preset duty cycle, and the preset duty cycle is the minimum duty cycle of the pulse-width modulation signal in the second mode.

In a fourth aspect of the present application, a control method of a power tool is provided. The power tool includes an electric motor, a power supply module, a driver circuit, a control module, and a detection module. The electric motor includes a rotor and multi-phase stator windings, where the electric motor is a sensorless brushless motor. The power supply module includes a power supply configured to supply power to the electric motor. The driver circuit is electrically connected to the electric motor and the power supply module and is configured to apply a voltage of the power supply module to the electric motor. The control module is electrically connected to the driver circuit and is configured to output a control signal to the driver circuit to control the driver circuit. The detection module is electrically connected to the multi-phase stator windings and is configured to detect an electrical parameter of each of the multi-phase stator windings during the operation of the electric motor. The control method includes: controlling the electric motor to enter an open-loop control mode when a start signal is detected; detecting a terminal voltage of a stator winding that is connected to the power supply and defining the terminal voltage as a modulation terminal voltage; detecting a terminal voltage of a stator winding that is not connected to the power supply and defining the terminal voltage as a floating terminal voltage; and controlling the electric motor to switch from the open-loop control mode to a closed-loop control mode when variation amplitudes and trends of the modulation terminal voltage and the floating terminal voltage meet preset conditions.

DETAILED DESCRIPTION

Figure 1:
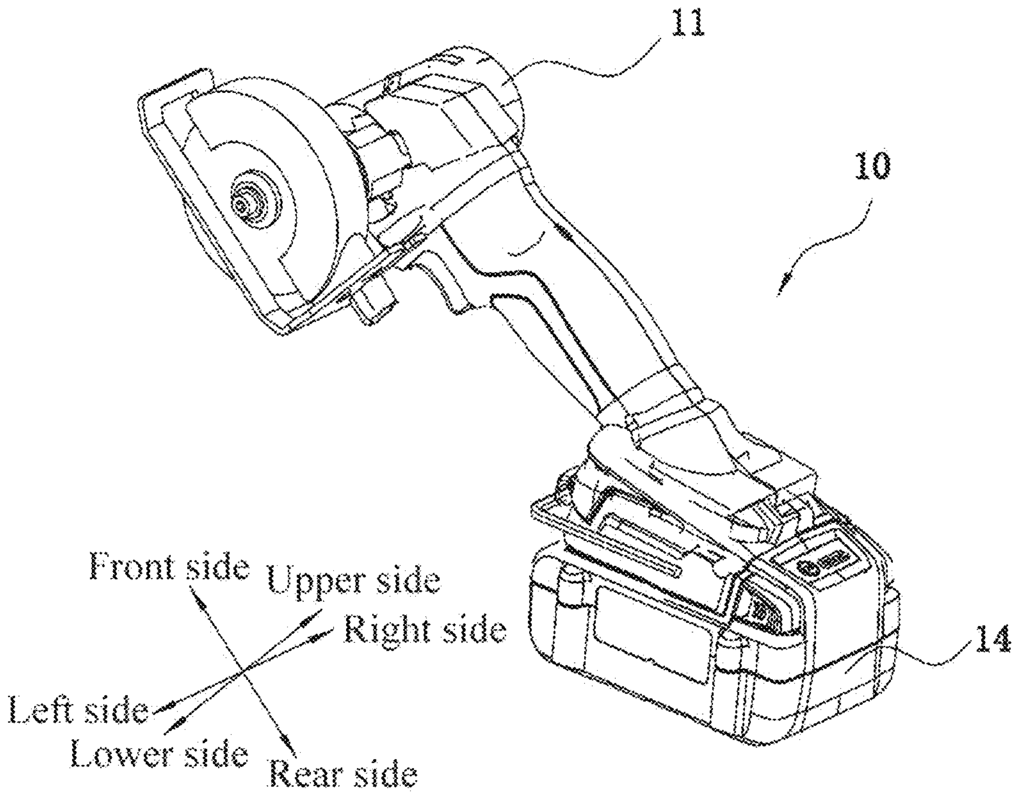
FIG. 1 is a perspective view of an angle grinder according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

For the control of a brushless motor, it is necessary to detect the position of the rotor. The position of the rotor refers to a rotational position of the rotor relative to the stator. In the related art, the position of the rotor is detected by using two different technologies. One is sensory control, that is, a position sensor is configured to directly detect the position of the rotor and generate a corresponding control signal. The other is sensorless control, that is, the position of the rotor or the change of the position is determined according to variations of electrical parameters of windings, and then the start and commutation of the brushless motor are controlled.

Sensory control can simplify control logic to make a control more direct. However, when the position of the sensor is inaccurate due to an assembly problem or other problems, the driving of the brushless motor is affected.

The cost of the sensorless control is lower. In the existing sensorless control, the rotor is forcibly driven to rotate first, not according to the position of the rotor. After the rotor rotates at a certain speed, the driving state is gradually switched according to the commutation control of the rotor, until a driving state corresponding to the position of the rotor is switched to. Then normal driving is performed. That is, open-loop control is performed on the brushless motor so that the rotor is forced to rotate, and then the brushless motor performs closed-loop operation to be normally driven.

With the existing sensorless control method, the rotor rotates when forcibly driven. However, the brushless motor cannot output sufficient torque because a driving state does not correspond to the position of the rotor. In addition, this control method depends on the capability of the rotor to rotate first at a certain initial speed. When the rotor of the brushless motor cannot rotate or is difficult to rotate for some reasons, it is difficult to enable the brushless motor to be in a correct driving state with this control method.

In the field of power tools, it is relatively common that a power tool starts with a load and bears a relatively large load; therefore, the existing brushless motors with the sensorless control are not well applicable to power tools. Especially for the existing grinding power tools such as an angle grinder, due to the large rotational inertia of a grinding disc, an incorrect initial position of the rotor easily causes a start failure of the electric motor during a sensorless start. As a result, a relatively high current spike is generated in the electric motor, and even demagnetization of the electric motor is caused. Moreover, in a heavy-load stage, due to the large rotational inertia of the grinding disc, if the position of the rotor cannot be accurately and timely identified, a high current spike is easily generated, resulting in shutdown protection.

The present application provides a power tool. The power tool uses a direct current brushless motor without a position sensor and can reduce a high current spike caused by a rotor identification error in a heavy-load operating condition (such as an electric angle grinder).

As shown in FIG. 1, the power tool may be an angle grinder 10. In other examples, the power tool may be another power tool with a heavy load, for example, a sanding tool or a grinding tool such as a grinding machine and a sander. For convenience of description, the angle grinder is used as an example of the power tool. Of course, the power tool may be another tool that can convert outputted torque into other forms of motion. These tools may be used for grinding workpieces, such as a sander. These tools may be used for cutting workpieces, such as a reciprocating saw, a circular saw, and a jig saw. These tools may be used for making an impact, such as an electric hammer. These tools may be garden tools, such as a pruner and a chainsaw. These tools may be vehicle-type power tools, such as a riding mower. These tools may be used for other purposes, such as a blender. As long as each of these power tools includes an electric motor that drives movements of working parts, the substance of technical solutions disclosed below may be adopted.

The angle grinder 10 is primarily used for cutting, grinding, and polishing metals, stones, and other materials. Orientations indicated by a front side, a rear side, an upper side, a lower side, a left side, and a right side in FIG. 1 each refer to orientations of the power tool relative to a user during use.

Figure 2:
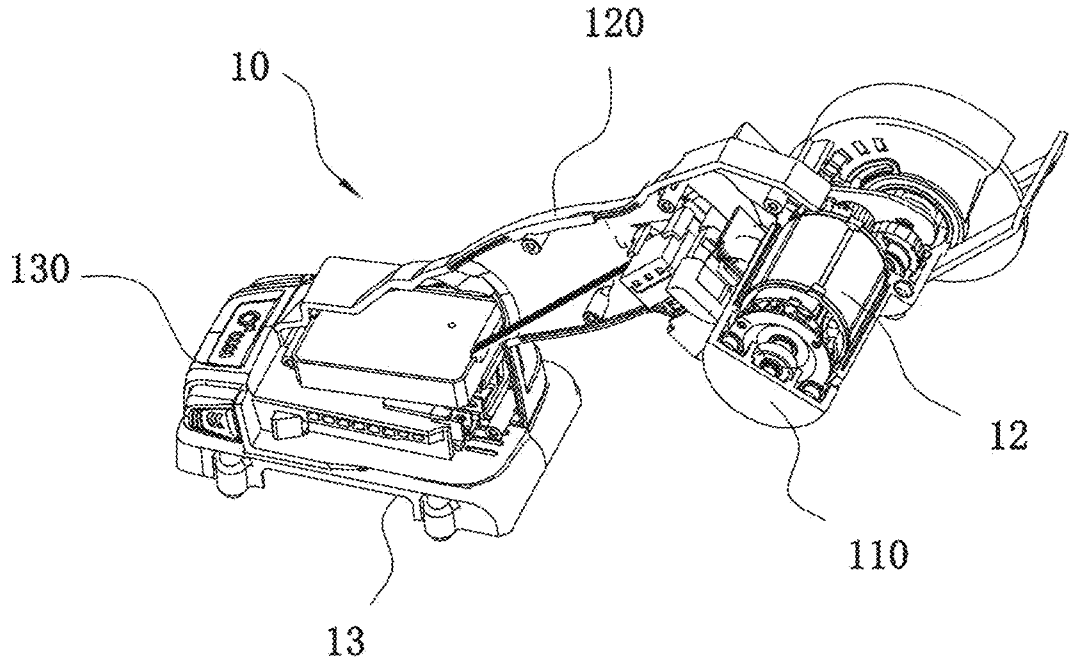
FIG. 2 is a perspective view of an angle grinder with part of a housing removed according to an example of the present application.

As shown in FIGS. 1 and 2, the angle grinder 10 includes a housing 11, a brushless motor 12, a battery pack coupling portion 13, a battery pack 14, and a control mainboard (not shown in the figure). The control mainboard is configured to drive the brushless motor 12 to rotate so that the power tool works. The brushless motor 12 is a direct current motor that includes no position sensor. The brushless motor 12 is supported on the housing 11. The battery pack coupling portion 13 is connected to or formed on the housing 11. The battery pack coupling portion 13 is electrically connected to the control mainboard in a circuit. The battery pack 14 is configured to supply power to the entire power tool and is mounted by mating with the battery pack coupling portion 13. Both the battery pack 14 and the brushless motor 12 are electrically connected to the control mainboard. In this example, as shown in FIGS. 1 and 2, the housing 1 sequentially includes an electric motor housing 110, a grip 120, and a battery housing 130 from front to rear. The brushless motor 12 is mounted in the electric motor housing 110. The grip 120 is held by the user. The battery pack 14 is detachably connected to the battery housing 130. As an optional solution, the grip 120 and the battery housing 130 constitute a whole. A left half housing and a right half housing are combined to form the whole. A front half housing and a rear half housing are combined to form the electric motor housing 110. The brushless motor 12 of the angle grinder 10 in this example may be a direct current brushless motor without a position sensor.

Figure 3:
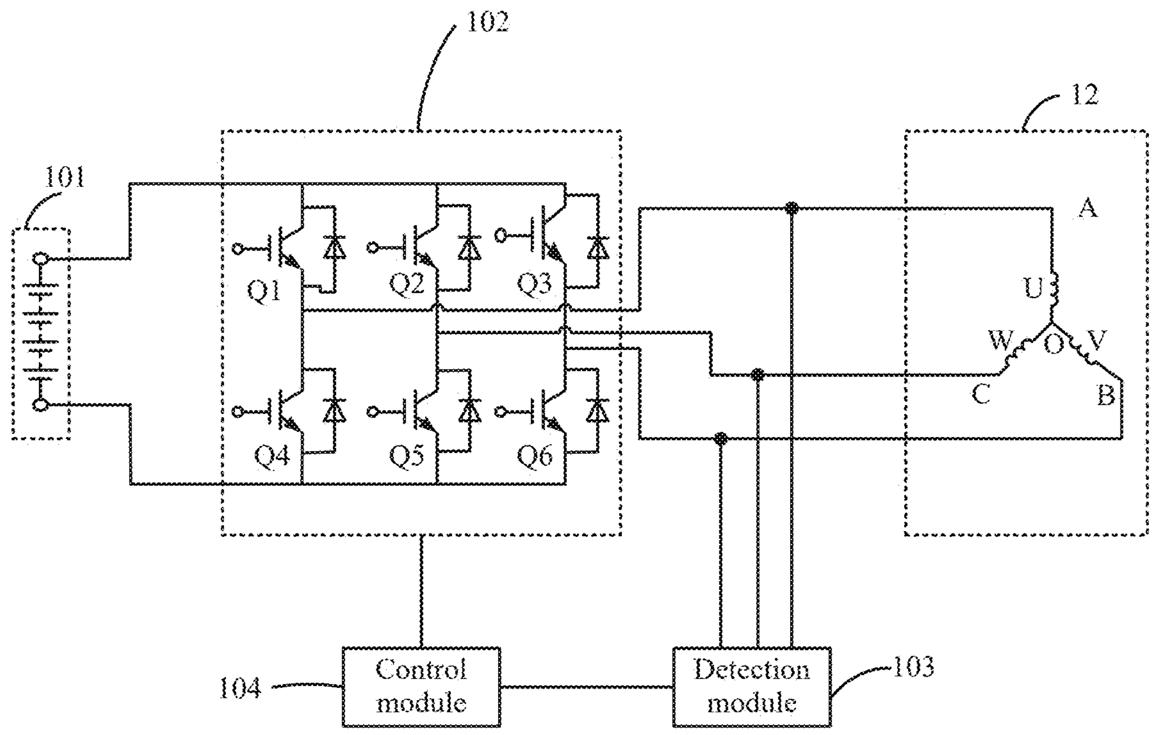
FIG. 3 is a block diagram of a circuit system according to an example of the present application.

A circuit system 100 of the power tool may be a circuit shown in FIG. 3. The circuit system 100 includes the brushless motor 12, a power supply module 101, a driver circuit 102, a detection module 103, and a control module 104.

The brushless motor 12 may include three-phase windings u, v, and w that form a Y connection. The connection terminals of the three-phase windings u, v, and w are defined as a phase input terminal A, a phase input terminal B, and a phase input terminal C, respectively. In other examples, the three-phase windings of the brushless motor 12 may form a delta connection.

The driver circuit 102 is electrically connected to the power supply module 101 and includes multiple switching elements. The driver circuit 102 is electrically connected to the control module 104 and the brushless motor 12. The driver circuit 102 can control, according to a control signal outputted by the control module 104, the brushless motor 12 to operate. In an example, the brushless motor 12 is a three-phase motor with the three-phase windings. Specifically, the driver circuit 102 is electrically connected to the three-phase windings of the brushless motor 12. Specifically, the driver circuit 102 includes a switching circuit. The switching circuit is configured to drive the operation of the rotor of the electric motor according to the control signal of the control module 104. To allow the electric motor to rotate, the driver circuit 102 has multiple driving states. In a driving state, the stator windings of the electric motor generate a magnetic field. The control module 104 is configured to output a corresponding drive signal to the driver circuit 102 according to a rotational position of the rotor of the brushless motor 12, so as to cause the driver circuit 102 to switch the driving state. In this manner, the state of a voltage and/or a current applied to the windings of the brushless motor 12 is changed, and an alternating magnetic field is generated to drive the rotor to rotate so that the electric motor is driven.

In an example, the driver circuit 102 includes the switching elements Q1, Q2, Q3, Q4, Q5, and Q6. Q1, Q3, and Q5 are high-side switching elements, and Q2, Q4, and Q6 are low-side switching elements. Any phase of stator winding of the brushless motor 12 is connected to one high-side switching element and one low-side switching element. The gate terminal of each switching element in the driver circuit 102 is electrically connected to the control module 104 and is configured to receive a control signal from the control module 104. The control signal may be a PWM signal. In an example, if the switching element is a metal-oxide-semiconductor field-effect transistor (MOSFET), the drain or source of each switching element is connected to a stator winding of the brushless motor 12. In an example, if the switching element is an insulated-gate bipolar transistor (IGBT), the collector or emitter electrode of each switching element is connected to a stator winding of the brushless motor 12. The switching elements Q1 to Q6 receive the control signals from the control module 104 to change respective conduction states, thereby changing the current loaded to the stator windings of the brushless motor 12 by the power supply module 101.

The detection module 103 is electrically connected to multi-phase stator windings of the brushless motor 12 and is configured to detect an electrical parameter of each of the multi-phase stator windings during operation of the brushless motor 12. Specifically, the electrical parameter may be an electrical parameter that can be directly detected, such as a voltage or a current, or may be a parameter calculated from the voltage or the current, such as a slope or a derivative.

The control module 104 is electrically connected to at least the detection module 103 and the driver circuit 102. The control module 104 is configured to control conduction conditions of the switching elements of the driver circuit 102, so as to control the operating mode of the brushless motor 12 and the driving state of the brushless motor 12. In some examples, the control module 104 uses a dedicated controller such as some dedicated control chips (for example, a microcontroller unit (MCU)). The control module 104 is integrated with a signal processing unit. The signal processing unit is configured to process acquired related parameter signals and has functions of calculation, comparison, and determination. After the signal processing unit processes the signals, the signal processing unit can generate control signals and output the control signals to the driver circuit 102, so as to drive the brushless motor 12 to operate.

The power supply module 101 includes a power supply. The power supply may be a direct current power supply or an alternating current power supply. In some examples, the power supply may be a direct current power supply, and the direct current power supply may specifically be the battery pack 14. The battery pack 14 may include a battery having a positive electrode and a negative electrode. The battery pack 14 may be detachably mounted to the power tool. Alternatively, the battery pack 14 may be mounted to the power tool and cannot be detached from the power tool. It is to be understood that the battery pack 14 can be repeatedly charged and discharged. In an example, the power supply is utility power.

As shown in FIG. 3, in an example, the control module 104 controls electronic switches Q1 and Q6 to be turned on and other electronic switches Q2, Q3, Q4, and Q5 to be turned off. In this case, the positive electrode of the battery pack 14 in the power supply module 101 is connected to the phase input terminal A through the electronic switch Q1, and the negative electrode of the battery pack 14 is connected to the phase input terminal B through the electronic switch Q6. The phase input terminal C is not connected to the positive electrode of the battery or the negative electrode of the battery because the electronic switches Q2 and Q5 are both in the off state (or the electronic switches Q2 and Q5 are off unidirectionally). The conduction states of the electronic switches in the driver circuit 102 cause the power supply module 101 to apply voltages to the phase input terminal A and the phase input terminal B but cause the phase input terminal C to float. That is to say, the windings u and v are turned on, and the winding wis floating. In this example, a terminal voltage of a stator winding that is connected to the power supply is defined as a modulation terminal voltage, and a terminal voltage of a stator winding that is not connected to the power supply, that is, a floating phase, is defined as a floating terminal voltage. For simplicity of description, this state of the circuit system may be defined as a driving state AB outputted by the driver circuit 102.

It is to be noted that a floating phase input terminal herein means that the phase input terminal is not connected to the power supply and does not mean that the phase input terminal is not connected to any circuit. For example, the phase input terminal is connected to the detection module 103 for detecting a voltage or a current.

As shown in FIG. 3, the electronic switches in the driver circuit 102 are controlled in a similar manner so that the driver circuit 102 can also output a driving state BA, a driving state BC, a driving state CB, a driving state AC, and a driving state CA.

The detection module 103 is connected to the phase input terminal A, the phase input terminal B, and the phase input terminal C separately. The detection module 103 is mainly configured to detect a voltage or a current at a node to which the detection module 103 is connected.

The control module 104 is configured to receive a signal from the detection module 103 and control the implementation and switchover of a driving state by sending a control signal to a corresponding electronic switch in the driver circuit 102. Specifically, the control module 104 may be connected to the detection module 103, and the control module 104 may be connected to the driver circuit 102 to transmit a control signal. More specifically, the control module 104 may be connected to control terminals of the electronic switches Q1 to Q6 separately. In addition, the control module 104 may be connected to the power supply module 101 so that the power supply module 101 supplies power to the control module 104.

For convenience of description, the driving state AB, the driving state AC, the driving state BC, the driving state BA, the driving state CA, and the driving state CB are simply expressed as AB, AC, BC, BA, CA, and CB in the description of the present application. When the brushless motor 12 is normally driven to rotate, the control module 104 controls the driver circuit 102 to periodically output the driving states AB, AC, BC, BA, CA, and CB. The control module 104 switches the driving states to make the windings of the brushless motor 12 generate a changing magnetic field, so as to drive the rotor to rotate. Of course, the control module 104 may also control the driver circuit 102 to periodically output the following driving states: AB, CB, CA, BA, BC, and AC.

The direct current brushless motor 12 without a position sensor has an open-loop control mode and a closed-loop control mode. Since the brushless motor has no position sensor, an accurate position of the rotor needs to be determined in the open-loop control mode after the brushless motor starts. After the position of the rotor is determined, the control module 104 can control the brushless motor 12 to switch from the open-loop control mode to the closed-loop control mode.

Only if a driving state outputted when the control module 104 controls the driver circuit 102 to drive the brushless motor 12 matches the position of the rotor of the brushless motor 12, can the rotor obtain large torque. That is to say, the control module 104 needs to control the switchover of the driving state according to the position of the rotor. When the driving state does not match the position of the rotor, the efficiency and capability of the brushless motor 12 are affected.

In the open-loop control mode, the detection module 103 detects electrical parameters of the multi-phase stator windings and determines the position of the rotor according to the electrical parameters. In the closed-loop control mode, the detection module 103 may not detect the electrical parameters of the multi-phase stator winding, and the control module 104 controls the brushless motor 12 to rotate, so as to normally drive a work accessory such as a grinding disc to rotate. Thus, the working requirement of the user is met. In an example, a duty cycle of the brushless motor 12 and a rotational speed of the brushless motor 12 in the open-loop control mode are less than a duty cycle of the brushless motor 12 and a rotational speed of the brushless motor 12 in the closed-loop control mode.

The brushless motor 12 includes a driving state and a coasting state in the open-loop control mode. In the driving state, the control module 104 controls the power supply to supply power to the multi-phase stator windings, and the brushless motor 12 is driven by the power to rotate. In the coasting state, the control module 104 controls the power supply to stop supplying power to the multi-phase stator windings, but the brushless motor 12 continues rotating due to inertia. The detection module 103 detects the electrical parameters of the multi-phase stator windings of the brushless motor 12 in the coasting state.

The control module 104 is configured to control the brushless motor 12 to switch from the open-loop control mode to the closed-loop control mode when the electrical parameter detected by the detection module 103 reaches a preset electrical parameter value.

In some examples, the control module 104 may output a control signal with a preset duty cycle to the driver circuit at a preset frequency, so as to drive the multi-phase stator windings of the electric motor to perform commutation in a preset commutation sequence. In the present application, the duty cycle and the frequency are preset and may be changed as required.

The control module 104 compares and analyzes the electrical parameter detected by the detection module 103 and determines a present position of the rotor accordingly. When the electrical parameter reaches the preset electrical parameter value, the control module 104 outputs a control signal corresponding to the present position of the rotor to control the brushless motor 12 to switch from the open-loop control mode to the closed-loop control mode.

It is found through experiments that when no voltage is applied to each phase winding at all, the rotor of the brushless motor 12 is rotated for one electrical cycle by means of an external force, and when the rotor is at positions corresponding to different driving states, the voltage at each phase input terminal is detected. It is found that the voltage varies when the rotor is at different positions. Therefore, the position of the rotor may be determined according to the variation trend of the electromotive force generated by the winding, and then the brushless motor 12 is controlled to switch from the open-loop control mode to the closed-loop control mode. Specifically, when the variation amplitude and trend of the electrical parameter detected by the detection module 103 meet a preset condition, the control module 104 may control the brushless motor 12 to switch from the open-loop control mode to the closed-loop control mode.

In an example, the control module 104 controls the driver circuit 102 to output the driving states AB-AC-BC-BA-CA-CB or the driving states AB-CB-CA-BA-BC-AC for a preset period, and the detection module 103 detects a variation of a voltage or a current at each phase input terminal in different driving states to obtain a corresponding electrical parameter. The electrical parameter may be a voltage or a current.

In some examples, the electrical parameter may be a slope of the modulation terminal voltage and a slope of the floating terminal voltage. In other examples, the electrical parameter is a derivative of a voltage, which may be either a first derivative or a derivative above a second derivative. In another example, a voltage difference, in place of the slope or the derivative, may be used for indicating a voltage variation degree.

Figure 4:
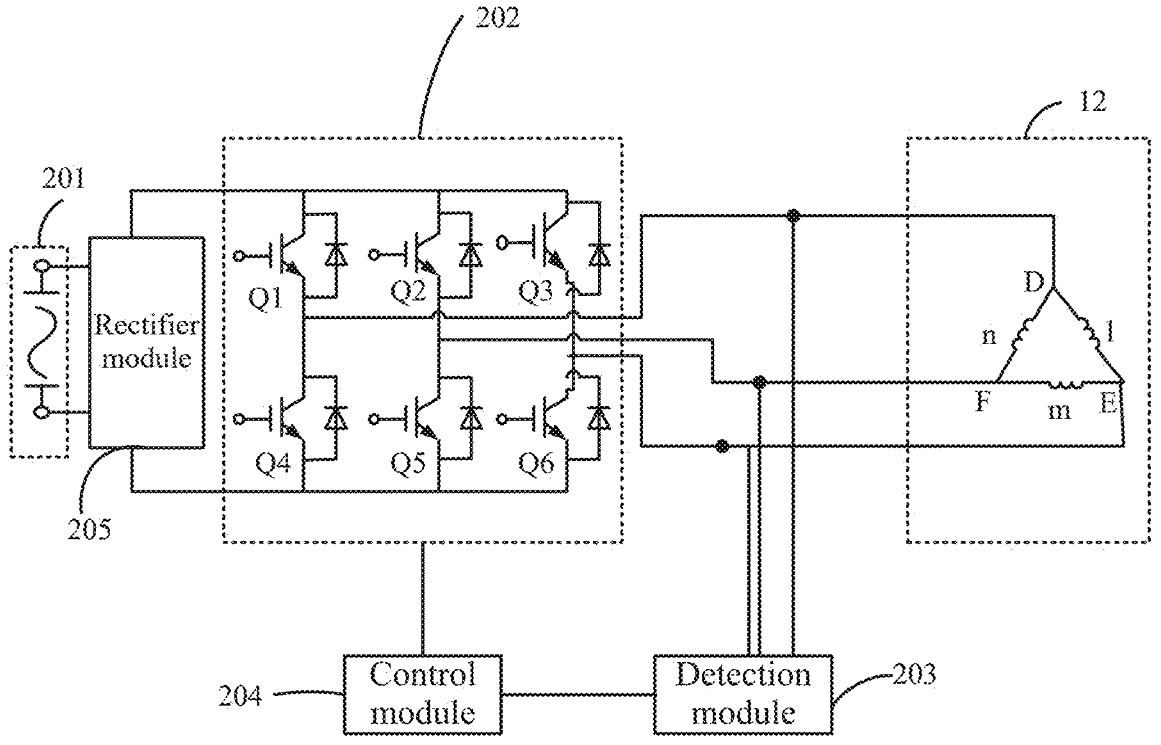
FIG. 4 is a block diagram of a circuit system according to an example of the present application.

As shown in FIG. 4, the present application further provides a power tool, and a power supply of the power tool is an alternating current. For convenience of description, in this example, only the differences between this example and the preceding examples are described, and the same reference numeral is used for a component which is the same as or similar to that in the preceding examples. The portions in the preceding examples that are compatible with this example may be applied to this example, and only the differences between this example and the preceding examples are described below.

A circuit system 200 of the power tool in this example includes a brushless motor 12, a power supply module 201, a driver circuit 202, a detection module 203, a control module 204, and a rectifier module 205.

The three-phase windings of the brushless motor 12 may form the Y connection or a delta connection. In some examples, the brushless motor 12 may include the three-phase windings 1, m, and n that form the delta connection. The delta connection differs from the Y connection in that connecting terminals of each phase winding are connected to terminals of two different windings, respectively. That is, one of the two connecting terminals of the winding 1 is connected to a connecting terminal of the winding m and the other of the two connecting terminals of the winding 1 is connected to a connecting terminal of the winding n. In this connection manner, connecting terminals of the three-phase windings 1, m, and n are connected end to end in sequence. Thus, in the delta connection, the three-phase windings essentially have three winding input terminals. The three winding input terminals are defined as a winding input terminal D, a winding input terminal E, and a winding input terminal F.

The detection module 203 is electrically connected to the multi-phase stator windings of the brushless motor 12 and is configured to detect the electrical parameter of each of the stator windings during the operation of the brushless motor 12. In an example, the detection module 203 may detect an electrical parameter at a node at which the detection module 203 is connected to a stator winding during the operation of the brushless motor 12.

The driver circuit 202 is electrically connected to the power supply module 201 and includes multiple switching elements.

The control module 204 is electrically connected to at least the detection module 203 and the driver circuit 202. The control module 104 is configured to control conduction conditions of the switching elements of the driver circuit 202, so as to control the operating mode of the brushless motor 12 and the driving state of the brushless motor 12.

The power supply module 201 includes an alternating current power supply. The circuit system 200 further includes the rectifier module 205 configured to convert an alternating current into a direct current.

Figure 5:
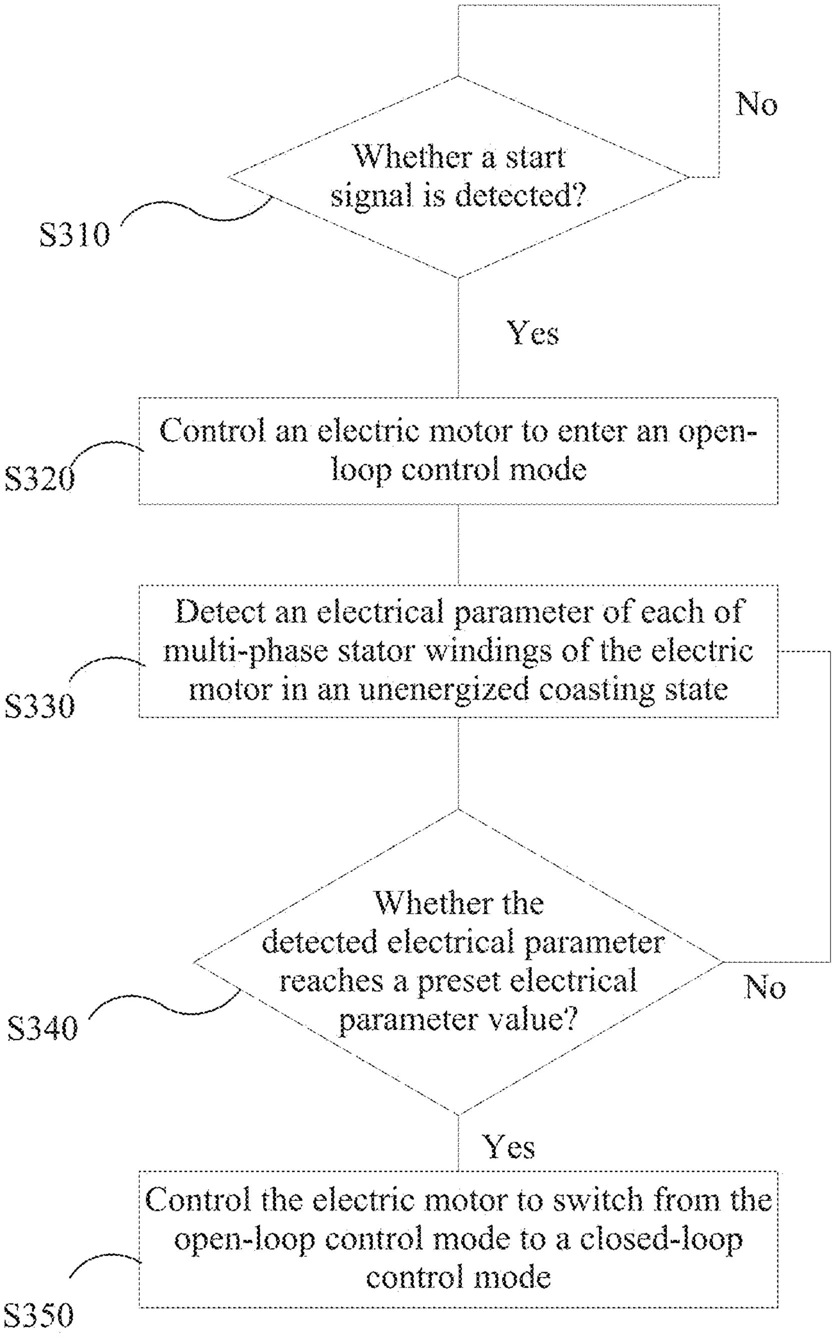
FIG. 5 is a flowchart of a method for controlling a brushless motor of a power tool according to an example of the present application.

As shown in FIG. 5, the present application further provides a control method S300 of a power tool. With the control method S300, an occasion for controlling the brushless motor 12 to switch from the open-loop control mode to the closed-loop control mode can be accurately identified, thereby avoiding a high current spike. For convenience of description, in this example, only the differences between this example and the preceding examples are described, and the same reference numeral is used for a component which is the same as or similar to that in the preceding examples. The portions in the preceding examples that are compatible with this example may be applied to this example, and only the differences between this example and the preceding examples are described below.

The control method S300 of the power tool includes the steps below.

In S310, it is determined whether a start signal is detected.

If yes, step S320 is performed. Otherwise, the detection is continued. The start signal may be generated by the user by triggering an operation switch or controlling the power tool in another manner.

In S320, the brushless motor 12 is controlled to enter the open-loop control mode.

In S330, an electrical parameter of each of the multi-phase stator windings of the brushless motor 12 in the unenergized coasting state is detected.

In S340, it is determined whether the detected electrical parameter reaches a threshold of a preset electrical parameter.

If yes, step S350 is performed. Otherwise, the detection is continued. The electrical parameter may be an electrical parameter that can be directly detected, such as a voltage or a current, or may be a parameter calculated from the voltage or the current, such as a slope or a derivative.

In S350, the brushless motor 12 is controlled to switch from the open-loop control mode to the closed-loop control mode.

Figure 6:
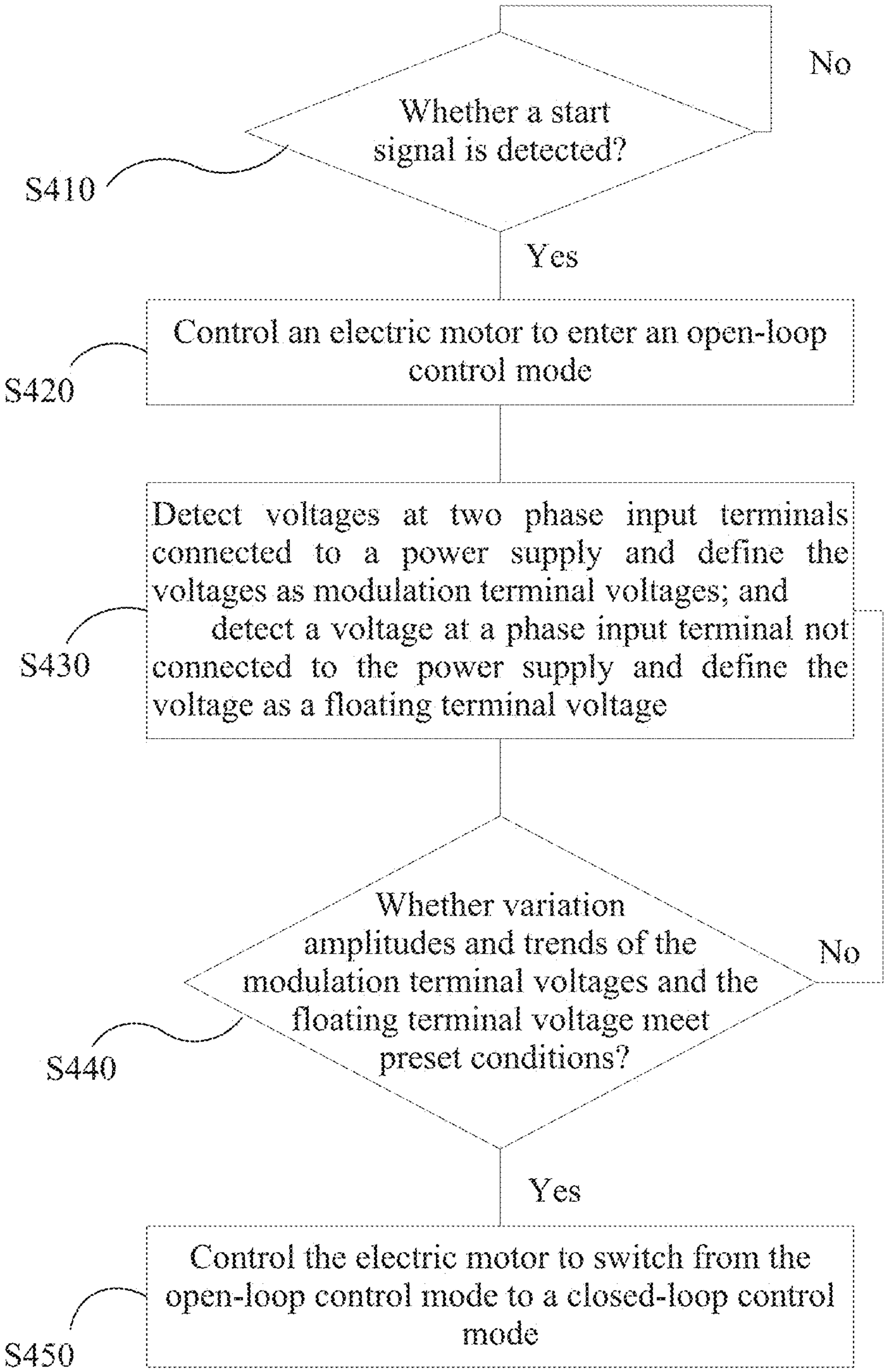
FIG. 6 is a flowchart of a method for controlling a brushless motor of a power tool according to an example of the present application.

As shown in FIG. 6, the present application further provides a control method S400 of a power tool. With the control method S400, an occasion for controlling the brushless motor 12 to switch from the open-loop control mode to the closed-loop control mode can be accurately identified, thereby avoiding a high current spike. For convenience of description, in this example, only the differences between this example and the preceding examples are described, and the same reference numeral is used for a component which is the same as or similar to that in the preceding examples. The portions in the preceding examples that are compatible with this example may be applied to this example, and only the differences between this example and the preceding examples are described below.

The control method S400 of the power tool includes the steps below.

In S410, it is determined whether a start signal is detected.

If yes, step S420 is performed. Otherwise, the detection is continued. The start signal may be generated by the user by triggering an operation switch or controlling the power tool in another manner.

In S420, the brushless motor 12 is controlled to enter the open-loop control mode.

In S430, voltages at two phase input terminals connected to the power supply are detected and the terminal voltages are defined as modulation terminal voltages, and a voltage at a phase input terminal not connected to the power supply is detected and the terminal voltage is defined as the floating terminal voltage.

In S440, it is determined whether variation amplitudes and trends of the detected modulation terminal voltages and the detected floating terminal voltage meet preset conditions.

If yes, step S450 is performed. Otherwise, the detection is continued. The electrical parameter may be an electrical parameter that can be directly detected, such as a voltage or a current, or may be a parameter calculated from the voltage or the current, such as a slope or a derivative.

In S450, the brushless motor 12 is controlled to switch from the open-loop control mode to the closed-loop control mode.

The power tool and other solutions applied in the preceding description are described below.

In an example, the solutions disclosed in FIGS. 1 to 6 are applied to a high-voltage brushless motor. High-voltage brushless motors are increasingly popular in the field of power tools, especially in the field of heavy-load power tools, due to their high power and small volumes. The high-voltage brushless motor is powered by utility power instead of a direct current battery pack. Although the technical solutions disclosed in the present application belong to the high-voltage brushless field, some concepts are also applicable in the field of power tools powered by direct currents. The high-voltage brushless motor uses a semiconductor switching device to implement electronic commutation. That is, a traditional contact commutator and an electric brush are replaced by an electronic switching device. The high-voltage brushless motor has the advantages of high reliability, no commutation spark, low mechanical noise, and the like and is widely applied to various power tools.

As shown in FIGS. 7 to 10, the present application provides a power tool using the brushless motor. The power tool can reduce a high current spike caused by a rotor identification error in a heavy-load operating condition (such as an electric angle grinder). In an example, the brushless motor is a high-voltage brushless motor without a position sensor.

Figure 7:
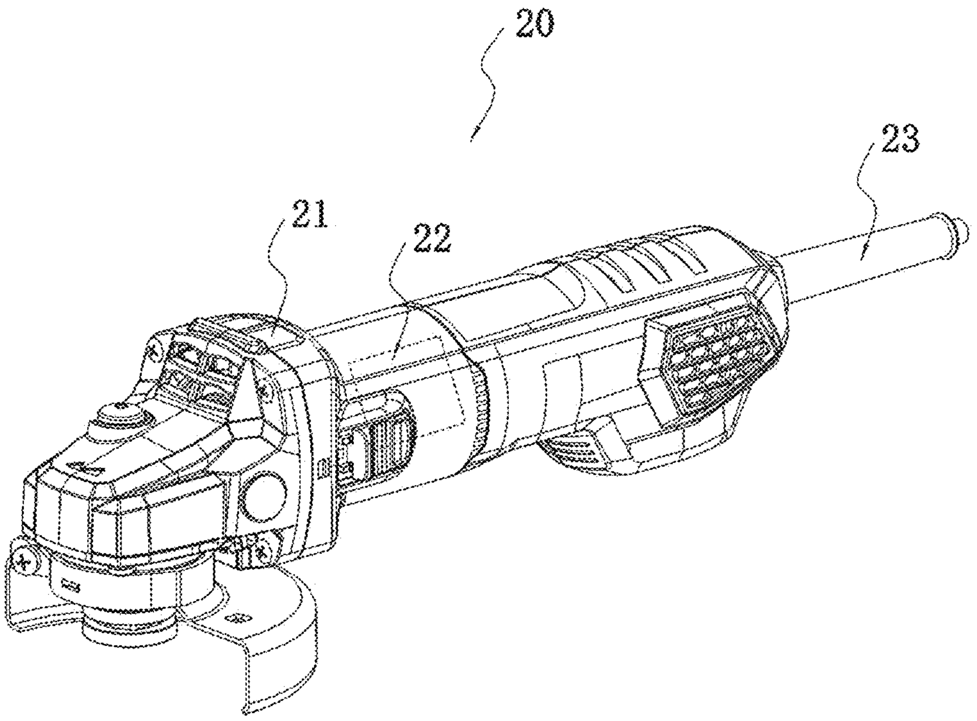
FIG. 7 is a perspective view of an angle grinder according to an example of the present application.

As shown in FIG. 7, an angle grinder 20 includes a housing 21, a brushless motor 22, a power cord 23, and a control mainboard (not shown in the figure). The control mainboard is configured to drive the brushless motor 22 to rotate so that the power tool works. The brushless motor 22 is a direct current motor without a position sensor. The brushless motor 22 is supported on the housing 21, and the power cord 23 is connected to an alternating current power supply. Both the power cord 23 and the brushless motor 22 are electrically connected to the control mainboard. The brushless motor 22 of the angle grinder 20 in this example may be an alternating current brushless motor without a position sensor.

As shown in FIG. 3, the direct current brushless motor 22 without a position sensor has an open-loop mode and a closed-loop mode. Since the brushless motor has no position sensor, an accurate position of the rotor needs to be determined in the open-loop mode after the brushless motor starts. After the position of the rotor is determined, the control module 104 can control the brushless motor 22 to switch from the open-loop mode to the closed-loop mode. In some examples, when the brushless motor is heavily loaded, if the position of the rotor cannot be identified in time, the brushless motor 22 may also be controlled to switch from the closed-loop mode to the open-loop mode, so as to prevent the brushless motor 22 from being damaged due to a relatively high current spike. The brushless motor 22 is switched to the closed-loop mode after the accurate position of the rotor is determined or the load is removed.

Only if a driving state outputted when the control module 104 controls the driver circuit 102 to drive the brushless motor 22 matches the position of the rotor of the brushless motor 22, can the rotor obtain large torque. That is to say, the control module 104 needs to control the switchover of the driving state according to the position of the rotor. When the driving state does not match the position of the rotor, the efficiency and capability of the brushless motor 22 are affected.

In some examples, the control module 104 controls an electrical signal of the driver circuit by outputting a pulse-width modulation (PWM) signal to a switching element of the driver circuit 102.

The control module 104 is configured to: acquire a present load parameter of the electric motor when the electric motor operates in a first mode; and control the electric motor to operate in a second mode and control a duty cycle of the pulse-width modulation signal to decrease to a first duty cycle when the present load parameter meets a first condition.

It is to be emphasized here that the first mode and the second mode may be different operating states of the electric motor. For example, in the first mode, an operating parameter of the electric motor meets one type of indicator while in the second mode, an operating parameter of the electric motor meets another type of indicator. The "operating parameter" here may be any one or more of a voltage, a current, a rotational speed, and the like.

In some examples, the first mode may be a constant-speed mode, that is, the power tool is controlled to operate at a constant rotational speed. It is to be noted that in the process where the power tool starts normally, reaches the rotational speed of the electric motor, and operates stably, the electric motor is usually in the first mode. A "constant speed" here does not necessarily mean that the rotational speed of the electric motor is completely unchanged, but means that the rotational speed of the electric motor may fluctuate slightly around a constant value. In the second mode, the maximum current of the electric motor does not exceed a current threshold. The current threshold is the maximum current allowed in a constant-current mode. The first duty cycle is less than or equal to a preset duty cycle. The preset duty cycle is the minimum duty cycle of the pulse-width modulation signal in the second mode. In some examples, the minimum duty cycle of the pulse-width modulation signal in the second mode is 20%. In some examples, the first duty cycle may be 8%. It is to be understood that the smaller the value of the first duty cycle, that is, the larger the difference between the preset duty cycle and the first duty cycle, the more easily the user perceives the variation of the rotational speed of the electric motor when the duty cycle of the pulse-width modulation signal decreases to the first duty cycle, and thus the user is reminded to remove the load. In some examples, the first condition may be that the present load parameter of the electric motor is greater than a load threshold of the electric motor. In some examples, the present load parameter of the electric motor may include a present rotational speed of the electric motor. In this case, the first condition is that the present rotational speed is less than a first rotational speed, where the first rotational speed is greater than or equal to the minimum rotational speed allowed in the first mode. Exemplarily, the first rotational speed may be 8000 rpm/min.

Specifically, in the first mode, the present load parameter of the electric motor is obtained in real time. When the present load parameter of the electric motor meets the first condition, that is, when a present load of the electric motor is excessively large, the duty cycle of the pulse-width modulation signal is controlled to decrease to the first duty cycle so that the electric motor can be continuously driven at the first duty cycle. In this manner, the user can be reminded that the present load is excessively large so that the user removes the load in time, thereby preventing the driver circuit from being damaged or the electric motor from being demagnetized and improving the reliability of the power tool. Compared with the solution that the electric motor is directly switched to a forced commutation state or directly stops when the load is excessively large in the related art, the solution in this example optimizes the user's feeling of using the angle grinder in a heavy-load stage.

In some examples, the control module 104 is further configured to: increase the duty cycle of the pulse-width modulation signal at a first preset rate after the duty cycle of the pulse-width modulation signal is controlled to decrease to the first duty cycle; and control the duty cycle of the pulse-width modulation signal to decrease to a second duty cycle when the present load parameter meets a second condition.

The first preset rate may be determined according to a performance parameter of the electric motor. The second condition may be that the present load parameter is greater than the load threshold of the electric motor. In some examples, the present load parameter of the electric motor may include the present rotational speed of the electric motor. In this case, the second condition includes the condition that the present rotational speed is less than a second rotational speed. The second rotational speed is greater than or equal to the minimum rotational speed of the electric motor allowed at a present duty cycle. For example, the second rotational speed may be 4000 rpm/min. In some examples, the present load parameter of the electric motor may include a present current of the electric motor. In this case, the second condition includes the condition that the present current is greater than or equal to a second current. The second current is less than or equal to the minimum current of the electric motor allowed at the present duty cycle. For example, the second current may be 16 A. In some examples, present load parameters of the electric motor may include the present rotational speed of the electric motor and the present current of the electric motor. In this case, the second condition includes the condition that the present rotational speed is less than the second rotational speed and the present current is greater than or equal to the second current. In this manner, it can be more accurately determined whether the user removes the load, thereby further improving the reliability of the power tool.

The second duty cycle is less than or equal to the preset duty cycle so that the user can be reminded of an overload. In some examples, the second duty cycle may be the same as or different from the first duty cycle, and the second duty cycle may be greater than or less than the first duty cycle.

In some examples, the control module 104 is further configured to control the electric motor to return to the first mode when the present load parameter does not meet the second condition.

It is to be understood that when the present load parameter does not meet the second condition, that is, when the user removes the load, the load of the electric motor is relatively small and the electric motor can operate normally. Therefore, the electric motor is controlled to return to the original first mode. In some examples, the first mode of the electric motor is the constant-speed mode, and the second mode of the electric motor is the constant-current mode. In the constant-speed mode, the rotational speed of the electric motor is controlled to be a constant rotational speed value. In the constant-current mode, the current of the electric motor is controlled to be less than the current threshold.

Specifically, after the duty cycle of the pulse-width modulation signal is controlled to decrease to the first duty cycle so that the user is reminded to remove the load, the duty cycle of the pulse-width modulation signal is increased at the first preset rate. In addition, when the present load parameter meets the second condition, that is, when the user does not remove the load, the duty cycle of the pulse-width modulation signal is controlled to decrease to the second duty cycle so that the user is reminded to remove the load again.

In some examples, the control module 104 is further configured to: increase the duty cycle of the pulse-width modulation signal at a second preset rate after the duty cycle of the pulse-width modulation signal is controlled to decrease to the second duty cycle; and control the electric motor to enter the forced commutation state when the present load parameter meets a third condition and self-commutation of the electric motor is not detected within a preset period. The "forced commutation state" mentioned in the present application is the technical solution described above in conjunction with FIGS. 1 to 6, that is, the process where the control module 104 controls the electric motor to switch from the open-loop control mode to the closed-loop control mode.

In the forced commutation state, the electric motor is controlled to be forced to perform commutation at a fixed period.

The second preset rate may be determined according to the performance parameter of the electric motor. In some examples, the second preset rate may be equal to the first preset rate. The third condition may be that the present load parameter is greater than the load threshold of the electric motor. In some examples, the present load parameter of the electric motor may include the present rotational speed of the electric motor. In this case, the third condition includes the condition that the present rotational speed is less than a third rotational speed. The third rotational speed is greater than or equal to the minimum rotational speed of the electric motor allowed at the present duty cycle. In some examples, the third rotational speed may be equal to the second rotational speed. In some examples, the present load parameter of the electric motor may include the present current of the electric motor. In this case, the third condition includes the condition that the present current is greater than or equal to a third current. The third current is less than or equal to the minimum current of the electric motor allowed at the present duty cycle. In some examples, the third current may be equal to the second current. In some examples, the present load parameter of the electric motor may include the present rotational speed of the electric motor and the present current of the electric motor. In this case, the third condition includes the condition that the present rotational speed is less than the third rotational speed and the present current is greater than or equal to the third current.

The self-commutation of the electric motor is not detected within the preset period, that is, the electric motor cannot correctly identify the position of the rotor under a present load. In this case, the efficiency and capability of the electric motor 22 are affected. In some examples, the control module 104 is further configured to control the electric motor to return to the first mode when the present load parameter does not meet the third condition.

It is to be understood that when the load parameter does not meet the third condition, that is, when the user removes the load, the load of the electric motor is relatively small and the electric motor can operate normally. Therefore, the electric motor is controlled to return to the first mode.

In some examples, the control module 104 is further configured to: start measuring a time after the electric motor enters the forced commutation state; and control the electric motor to stop if the present rotational speed does not exceed a fourth rotational speed or the present current is greater than or equal to a fourth current when the measured time reaches a first time.

In some examples, the first time may be 5 s. The fourth rotational speed is greater than or equal to the minimum rotational speed of the electric motor allowed at the present duty cycle. The present rotational speed does not exceed the fourth rotational speed, that is, the user does not remove the load. Since the driving state does not correspond to the position of the rotor in the forced commutation state, the electric motor cannot output sufficient torque. Therefore, the electric motor needs to be controlled to stop in time.

In some examples, the control module 104 is further configured to control the electric motor to return to the first mode if the present rotational speed exceeds the fourth rotational speed or the present current is greater than or equal to the fourth current when the measured time does not reach the first time. It is to be understood that when the present rotational speed exceeds the fourth rotational speed or the present current is greater than or equal to the fourth current, that is, when the user removes the load, the load of the electric motor is relatively small and the electric motor can operate normally. Therefore, the electric motor is controlled to return to the first mode.

In another example, the control module 104 is configured to: acquire the present load parameter of the electric motor; and control the current of the electric motor to decrease to the second current to remind the user to remove the load when the present load parameter meets the first condition.

In some examples, the present load parameter of the electric motor may include present power, the present rotational speed, and/or the present current of the electric motor. When the present load parameter of the electric motor includes the present current of the electric motor, the first condition may be that the present current of the electric motor is greater than or equal to a threshold current. The threshold current may be the maximum current that the electric motor can reach according to a characteristic curve of the electric motor. For example, the threshold current may be 20 A. In some examples, the second current is less than the threshold current. For example, the second current may be 10 A. It is to be understood that the less the second current, the more the rotational speed of the electric motor decreases, and the more easily the user perceives the variation of the rotational speed of the electric motor. Thus, the user is reminded that the present load is excessively large and the load needs to be removed.

In some examples, the control module 104 is further configured to, after the current of the electric motor is controlled to decrease to the second current, control the current of the electric motor to continuously decrease or remain at the second current if the present load parameters acquired within a preset period all meet the second condition.

In some examples, when the present load parameter of the electric motor includes the present power of the electric motor, the second condition may be that the present power of the electric motor is greater than threshold power. The threshold power is the maximum power that can be reached by the electric motor at the present current. For example, the second condition may be that the present power of the motor is greater than 2600 W. It is to be understood that when the present load parameter meets the second condition, that is, the user does not remove the load, the current of the electric motor is controlled to continuously decrease or remain at the second current so that the rotational speed of the electric motor continuously decreases, thereby continuously reminding the user to remove the load.

In some examples, the control module 104 is further configured to stop limiting the current of the electric motor if the load parameter of the electric motor does not meet the second condition within a threshold time T, that is, the user removes the load. In this case, the electric motor returns to a normal operating state. In some examples, the control module 104 is further configured to control the electric motor to stop to protect the electric motor if the load parameters of the electric motor all meet the second condition within the threshold time T, that is, the user does not remove the load. It is to be understood that when the current of the electric motor is decreased so that the user is reminded to remove the load and the rotational speed of the electric motor is decreased to a certain value, the electric motor stalls and cannot operate normally. Therefore, the electric motor may be controlled to stop in time when the rotational speed is relatively low so that the electric motor is prevented from stalling.

In some examples, the control module 104 is further configured to: acquire the rotational speed of the electric motor and the current of the electric motor; start measuring a time when the acquired current is greater than or equal to the second current and the acquired rotational speed is less than the first rotational speed; and determine a stopping occasion of the electric motor according to the measured time and the acquired rotational speed, where the rotational speed is always greater than zero.

The second current is less than or equal to the threshold current. The threshold current is the maximum current allowed by the electric motor. If the present current of the electric motor is greater than the threshold current, the elements of a circuit board may be damaged by the overcurrent. In some examples, when the current of the electric motor is greater than the second current and output torque of the electric motor is first torque, the rotational speed of the electric motor is a first preset rotational speed. On the characteristic curve of the electric motor, a rotational speed corresponding to the first torque is a second preset rotational speed, and the first preset rotational speed is less than or equal to the second preset rotational speed. That is, the rotational speed of the electric motor at the second current is lower than the rotational speed corresponding to the same torque on the characteristic curve of the electric motor. This configuration helps to prevent the electric motor from being damaged. That is, in the case where the current is greater than the second current, the rotational speed of the electric motor may be lower than the rotational speed corresponding to the equivalent torque on the characteristic curve of the electric motor because the current of the power tool is limited. The first rotational speed may be less than or equal to the minimum rotational speed allowed at the present current.

Specifically, the rotational speed of the electric motor and the current of the electric motor are acquired, and after the acquired current is greater than the second current and the acquired rotational speed is less than the first rotational speed for a period, the electric motor is controlled to stop. Thus, the damage to the electric motor can be prevented.

In some examples, the control module 104 is specifically configured to control the electric motor to stop if the acquired rotational speed on each occasion is less than a set rotational speed when the measured time reaches a set time. The set time may be set according to temperature rise test results of the electric motor at different rotational speeds. When a different set rotational speed is provided, a different set time is provided accordingly. Thus, the user's feeling of using the power tool can be kept consistent before the electric motor stops. In some examples, the control module 104 is specifically configured to: control the electric motor to stop if the acquired rotational speed on each occasion is less than a first set rotational speed when the measured time reaches a first set time; and control the electric motor to stop if the acquired rotational speed on each occasion is less than a second set rotational speed when the measured time reaches a second set time. The first set time is less than the second set time, and the first set rotational speed is less than the second set rotational speed, that is, the set time is directly proportional to the set rotational speed. Thus, the electric motor can operate for a longer time on the premise that it is ensured that the electric motor is not damaged.

In some examples, the angle grinder is further provided with an electric motor temperature sensor. The electric motor temperature sensor may be disposed on the electric motor and configured to monitor a temperature of the electric motor. The control module 104 is further configured to: acquire the temperature of the electric motor; determine, after the start of the electric motor, whether an electrical parameter is greater than a preset electrical parameter if the temperature of the electric motor is greater than or equal to a first temperature when a start signal is detected; and control the electric motor to stop when the electrical parameter is greater than the preset electrical parameter.

The electric motor may be remotely controlled through an external device or may be controlled through a button. The start signal is detected, which means that a signal sent from the external device or sent through the button is received, where the signal causes the electric motor to start. The first temperature is less than a stop temperature of the electric motor. For example, the first temperature may be 67° C. In some examples, the electrical parameter may include the current and/or power of the electric motor. The preset electrical parameter may be less than or equal to a set electrical parameter of the electric motor. The set electrical parameter of the electric motor may be the maximum electrical parameter that can be reached by the electric motor when operating normally.

In some examples, the control module 104 is further configured to stop determining whether the electrical parameter is greater than the preset electrical parameter if the acquired temperature of the electric motor is less than the second temperature after the start of the electric motor.

The second temperature is less than the first temperature. For example, the second temperature may be 60° C.

In some examples, the control module 104 is further configured to: acquire the temperature of the electric motor in real time; and if the temperature of the electric motor is less than the first temperature when the start signal is detected, control the electric motor to stop when the acquired temperature of the electric motor is greater than or equal to a third temperature after the start of the electric motor.

The third temperature is greater than the first temperature. For example, the third temperature may be 70° C.

Specifically, the temperature of the electric motor is acquired in real time. When the start signal is detected, it is indicated that the temperature of the electric motor is excessively high and is prone to rise to the stop temperature in an operating process if the temperature of the electric motor is greater than or equal to the first temperature. Therefore, after the electric motor starts, it is necessary to determine whether the electrical parameter of the electric motor is greater than the preset electrical parameter in real time so that the electric motor is controlled to stop in time and prevented from being damaged by an overtemperature when the electrical parameter is greater than the preset electrical parameter. After the electric motor starts, it is indicated that the temperature of the electric motor returns to a lower temperature if the acquired temperature of the electric motor is less than the second temperature. In this case, the electric motor does not have the risk of being damaged by an overtemperature. Therefore, determining whether the electrical parameter is greater than the preset electrical parameter may be stopped, thereby saving the computing power of the control module 104. If the temperature of the electric motor is less than the first temperature when the start signal is detected, the temperature of the electric motor may be monitored after the start of the electric motor. When the temperature of the electric motor is greater than or equal to the third temperature, the electric motor is controlled to stop so that the electric motor is prevented from being damaged by an overtemperature, thereby helping prolong the service life of the angle grinder.

The rated operating voltage of a high-voltage brushless motor is generally 220V-240V. Due to voltage fluctuation, the high-voltage brushless motor is required to be capable of operating normally in a larger voltage range. In an example, the high-voltage brushless motor is required to be capable of operating normally within a voltage range of 170V-285V. Such a large voltage range affects the positioning of the rotor during the start of the electric motor. For example, if a positioning pulse with a fixed width is used, the rotor is prone to be inaccurately positioned at a low voltage, and as a result, the electric motor cannot obtain a relatively large torque; and an excessive current is prone to appear at a high voltage, and as a result, the electric motor starts short-circuit protection and even is burned out.

In this example, different positioning pulses are set according to different start voltages. This configuration aims to solve the problem that the rotor is inaccurately positioned when the high-voltage brushless motor is in the large voltage range, thereby helping improve the reliability of the high-voltage brushless motor. In this example, the control module 104 is further configured to acquire a voltage of the electric motor in real time and determine the width of a positioning pulse according to the voltage of the electric motor.

In some examples, the voltage of the electric motor may be a phase voltage of the electric motor or a bus voltage of the electric motor. In some examples, the voltage of the electric motor is inversely proportional to the width of the positioning pulse. That is, when the voltage of the electric motor is relatively low, a positioning pulse with a relatively large width may be set, and when the voltage of the electric motor is relatively high, a positioning pulse with a relatively small width may be set. Thus, when the electric motor starts at different voltages, the rotor can be accurately positioned, thereby improving the reliability of the high-voltage brushless motor and providing better use experience for the user without increasing the cost.

One analog detection unit of an MCU can detect only one analog signal. When multiple analog signals need to be detected, the MCU is usually required to have at least a corresponding number of analog detection units. However, the MCU of the power tool usually has a limited number of analog detection units. Therefore, when the MCU has the limited number of analog detection units, how to use one analog detection unit of the MCU to detect two different analog signals becomes a technical problem to be solved urgently in the field.

Figure 8:
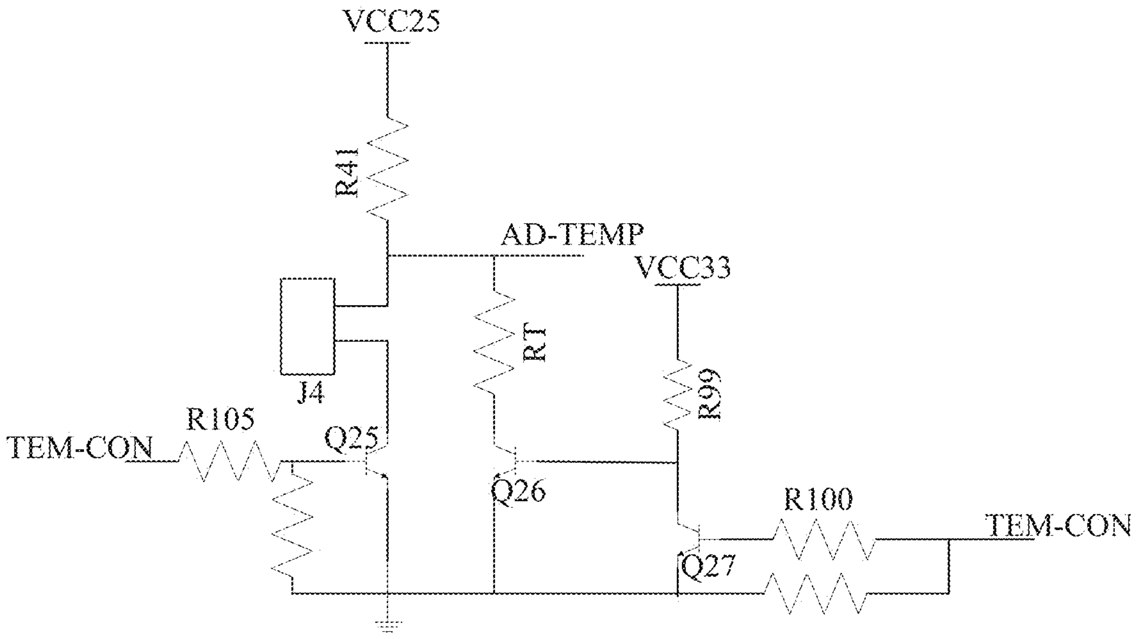
FIG. 8 is a structural diagram of a detection circuit according to an example of the present application.

FIG. 8 is a structural diagram of a detection circuit according to an example of the present application. As shown in FIG. 8, in the detection circuit provided in this example, an I/O port TEM_CON of an MCU is connected to a control terminal of a first triode Q25 through a resistor R105, a first power supply VCC25 is connected to a first terminal of a temperature sensor J4 of an electric motor through a resistor R41, a second terminal of the temperature sensor J4 is connected to an input terminal of the first triode Q25, and an output terminal of the first triode Q25 is grounded. In addition, the first terminal of the temperature sensor J4 is also connected to an analog detection unit AD-TEMP of the MCU. A control terminal of a second triode Q26 is connected to the I/O port TEM_CON of the MCU through a resistor R99, an input terminal of the second triode Q26 is connected to a second power supply VCC33 through the resistor R99, and an output terminal of the second triode Q26 is grounded. A control terminal of a third triode Q27 is connected to the I/O port TEM_CON of the MCU through a resistor R100, an input terminal of the third triode Q27 is connected to the second power supply VCC33 through the resistor R99, and an output terminal of the third triode Q27 is grounded. Thus, in the detection circuit provided in this example, when the I/O port TEM_CON of the MCU is at a low level, Q27 is off. As a result, Q26 is on, and Q25 is off. In this case, the analog detection unit AD-TEMP of the MCU collects a signal from RT. RT is a temperature sensor. For example, the temperature sensor RT is configured to collect a temperature of an IGBT. Correspondingly, when the I/O port TEM_CON of the MCU is at a high level, Q27 is on. As a result, Q26 is off, and Q25 is on. In this case, the analog detection unit AD-TEMP of the MCU collects a signal from J4. J4 may be a temperature sensor of the electric motor and is configured to collect a temperature of the electric motor. Thus, when the TEM_CON signal received by the I/O port of the MCU alternates between a high level and a low level, a single analog detection unit of the MCU can collect two different analog signals on different occasions. That is, the analog detection unit of the MCU can alternately collect the temperature of the IGBT and the temperature of the electric motor. Thus, resources can be saved, and the cost of the power tool is reduced.

Figure 9:
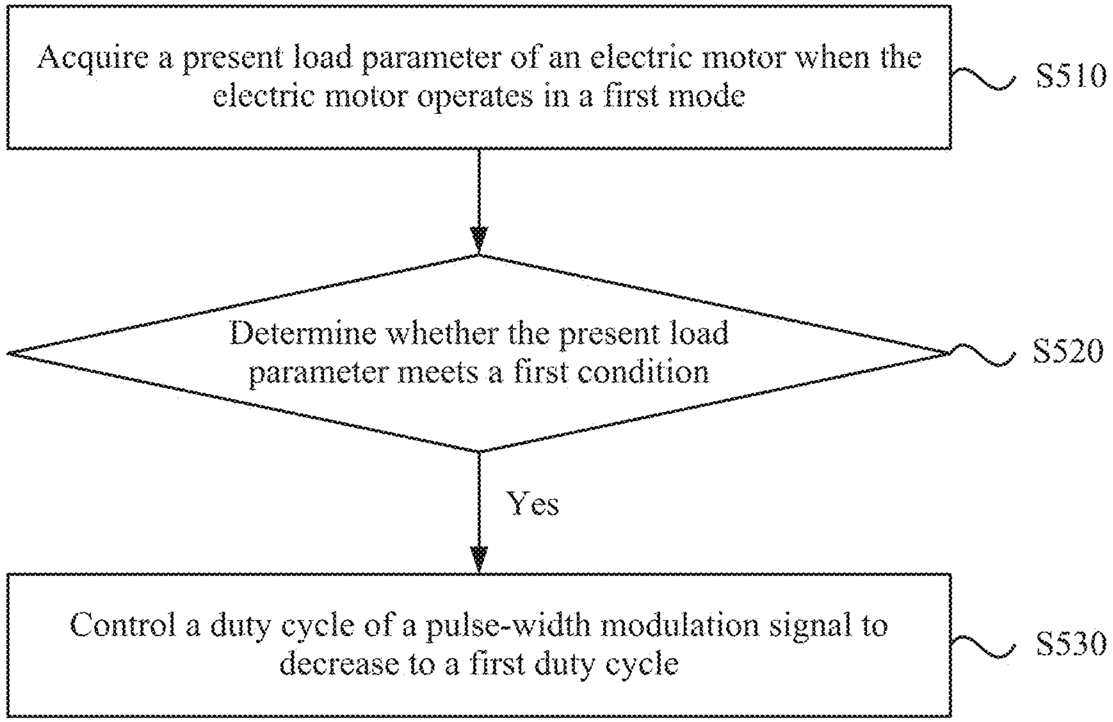
FIG. 9 is a flowchart of a control method of a power tool according to an example of the present application.

FIG. 9 is a flowchart of a control method of a power tool according to an example of the present application. The present application furthers provides the control method of the power tool. As shown in FIG. 9, the method includes the steps below.

In S510, a present load parameter of an electric motor is acquired in a first mode.

In S520, it is determined whether the present load parameter meets a first condition.

It is to be noted that the first condition here is used for determining whether the user removes a load. If the user removes the load, the present load parameter does not meet the first condition. If the user does not remove the load, the present load parameter meets the first condition.

In S530, if yes, a duty cycle of a pulse-width modulation signal is controlled to decrease to a first duty cycle.

It is to be noted that if the present load parameter meets the first condition, that is, the user does not remove the load, the power tool enters a second mode to operate, where the second mode is different from the first mode. The first duty cycle is less than or equal to a preset duty cycle. The preset duty cycle is the minimum duty cycle of the pulse-width modulation signal in the second mode.

FIG. 6 is another flowchart of a control method of a power tool according to an example of the present application. In some examples, the control method of the power tool further provided in the present application further includes the steps below.

In S540, the duty cycle of the pulse-width modulation signal is increased at a first preset rate after the duty cycle of the pulse-width modulation signal is controlled to decrease to the first duty cycle.

In S550, it is determined whether the present load parameter meets a second condition.

It is to be noted that the second condition here is used for determining whether the user removes the load. If the user removes the load, the present load parameter does not meet the second condition. If the user does not remove the load, the present load parameter meets the second condition.

In S560, if yes, the duty cycle of the pulse-width modulation signal is controlled to decrease to a second duty cycle.

In some examples, if the present load parameter does not meet the second condition, the electric motor is controlled to return to the first mode and continues to operate in the original mode.

It is to be noted that a third condition here is used for determining whether the user removes the load. If the user removes the load, the present load parameter does not meet the third condition. If the user does not remove the load, the present load parameter meets the third condition.

In S570, the duty cycle of the pulse-width modulation signal is increased at a second preset rate.

In S580, it is determined whether the present load parameter meets the third condition.

In S590, if yes, it is determined whether self-commutation of the electric motor is detected within a preset period.

In S6100, if not, the electric motor is controlled to enter a forced commutation state.

In the forced commutation state, the electric motor is controlled to be forced to perform commutation at a fixed period.

In some examples, if the present load parameter does not meet the third condition when the measured time does not reach a first time, the electric motor is controlled to return to the first mode. In some examples, the time starts to be measured after the electric motor enters the forced commutation state; and the electric motor is controlled to stop if a present rotational speed does not exceed a fourth rotational speed or a present current is greater than or equal to a fourth current when the measured time reaches the first time.

Any two or three of the first condition, the second condition, and the third condition involved in the present application may use the same load parameter for determination. When the same load parameter is used, specific values of the load parameter may be the same or different.

Figure 10:
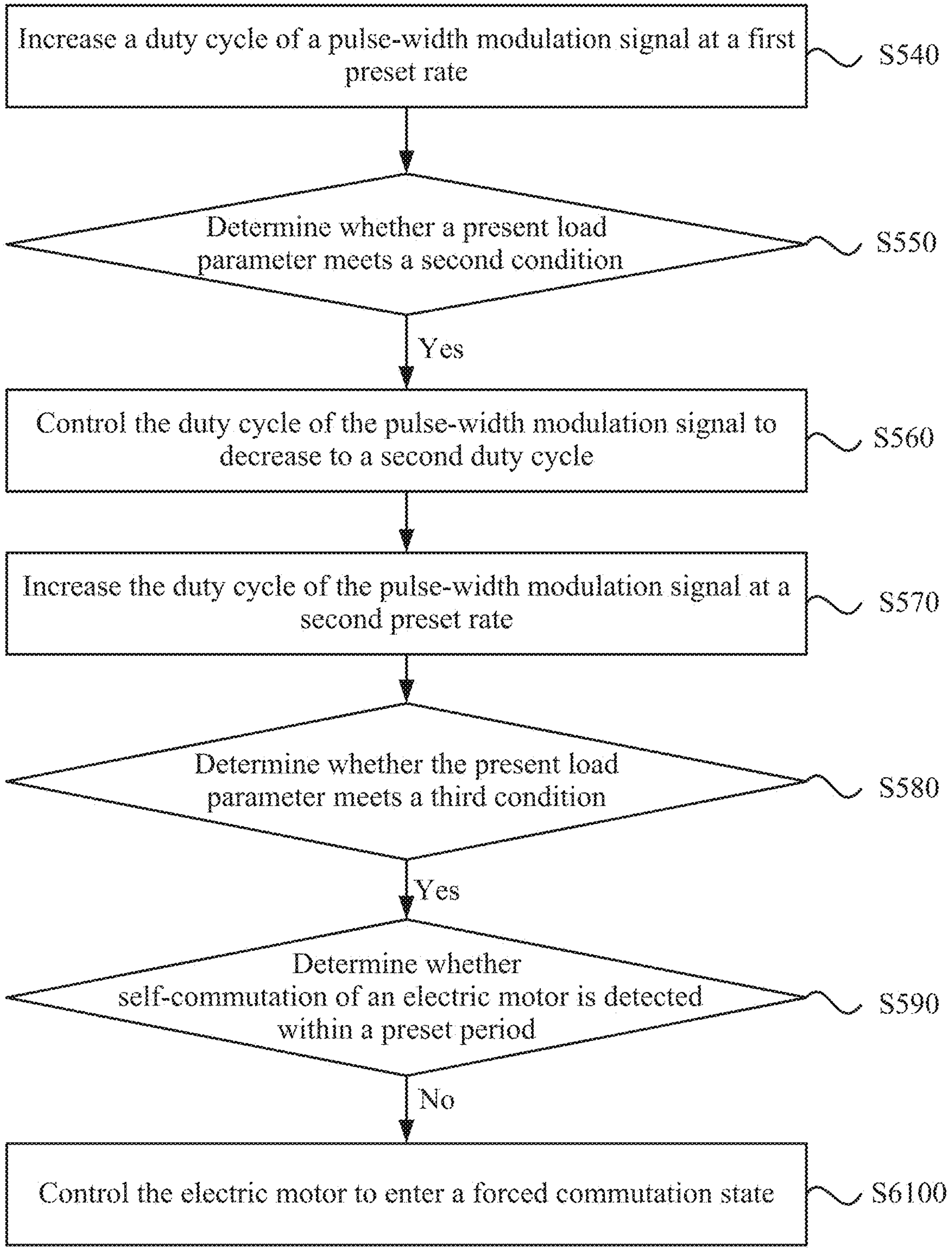
FIG. 10 is another flowchart of a control method of a power tool according to an example of the present application.
Figure 11:
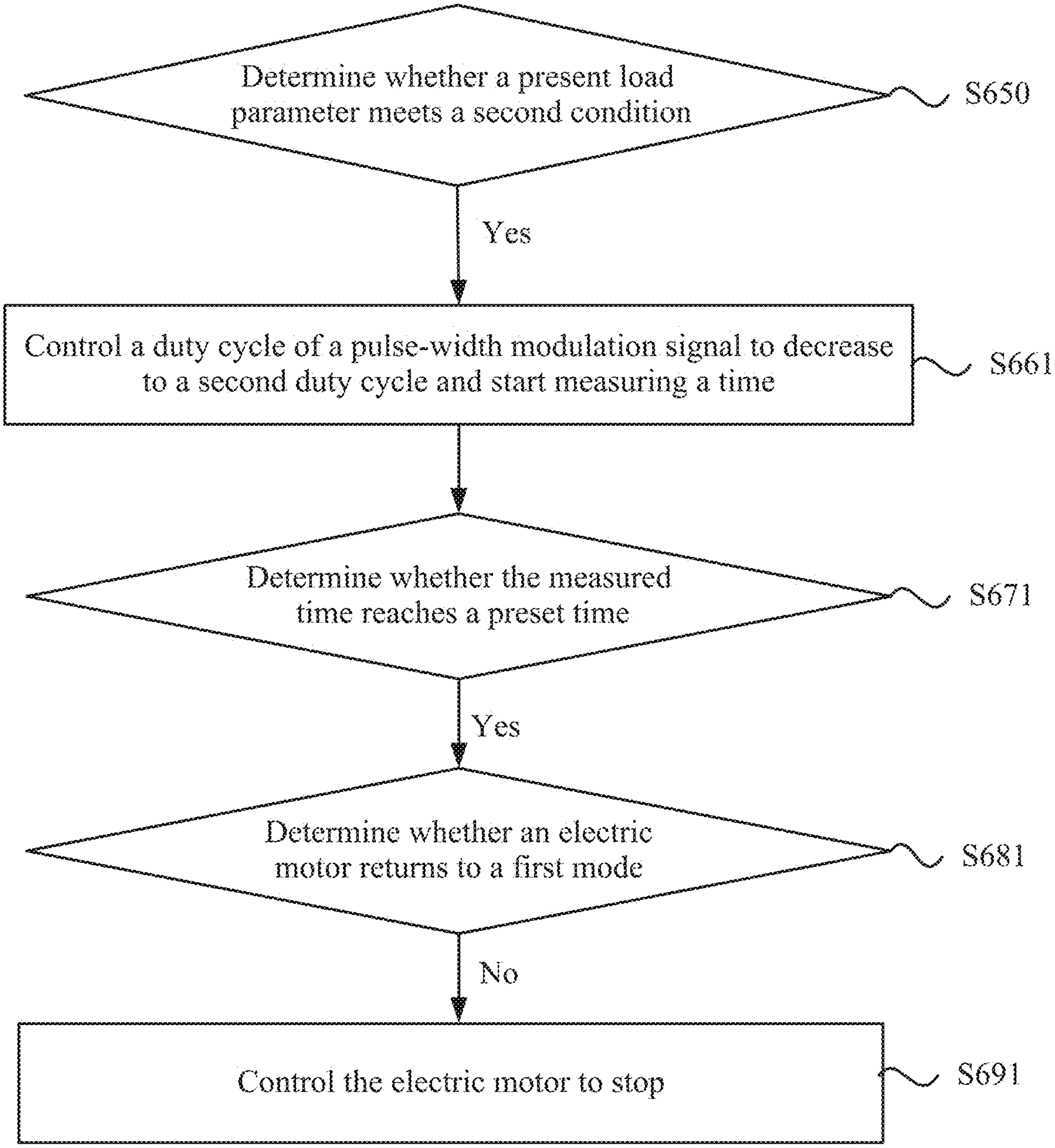
FIG. 11 is a flowchart of a control method associated with the example in FIG. 10.

The flowchart disclosed in FIG. 11 is associated with the flowchart disclosed in FIG. 10. As shown in FIG. 11, the control method includes the steps below.

In S650, it is determined whether the present load parameter meets the second condition.

In S661, if yes, the duty cycle of the pulse-width modulation signal is controlled to decrease to the second duty cycle, and the time starts to be measured.

In some examples, if the present load parameter does not meet the second condition, the electric motor is controlled to return to the first mode, and the time is not measured.

In S671, it is determined whether the measured time reaches a preset time.

In S681, if yes, it is determined whether the electric motor returns to the first mode.

In S691, if not, the electric motor is controlled to stop.

In some examples, the preset time may be 5 seconds. When the acquired measured time reaches the preset time and the power tool does not return to the first mode, the electric motor is controlled to stop. It is to be noted that step S550 in the flowchart shown in FIG. 11 is the same as step S550 in the flowchart shown in FIG. 10, and all subsequent steps are performed when the present load parameter meets the second condition. Therefore, the occasion at which the measured time reaches the preset time may be in any step between S570 and S6100 in FIG. 6. That is, the control of the electric motor to stop in step S691 may occur on any occasion between S570 and S6100. In this manner, when the electric motor cycles for a certain period in the control cycle shown in FIG. 10 and the user does not remove the load, the power tool can avoid further damage to components such as the electric motor and a control board by actively stopping.

Figure 12:
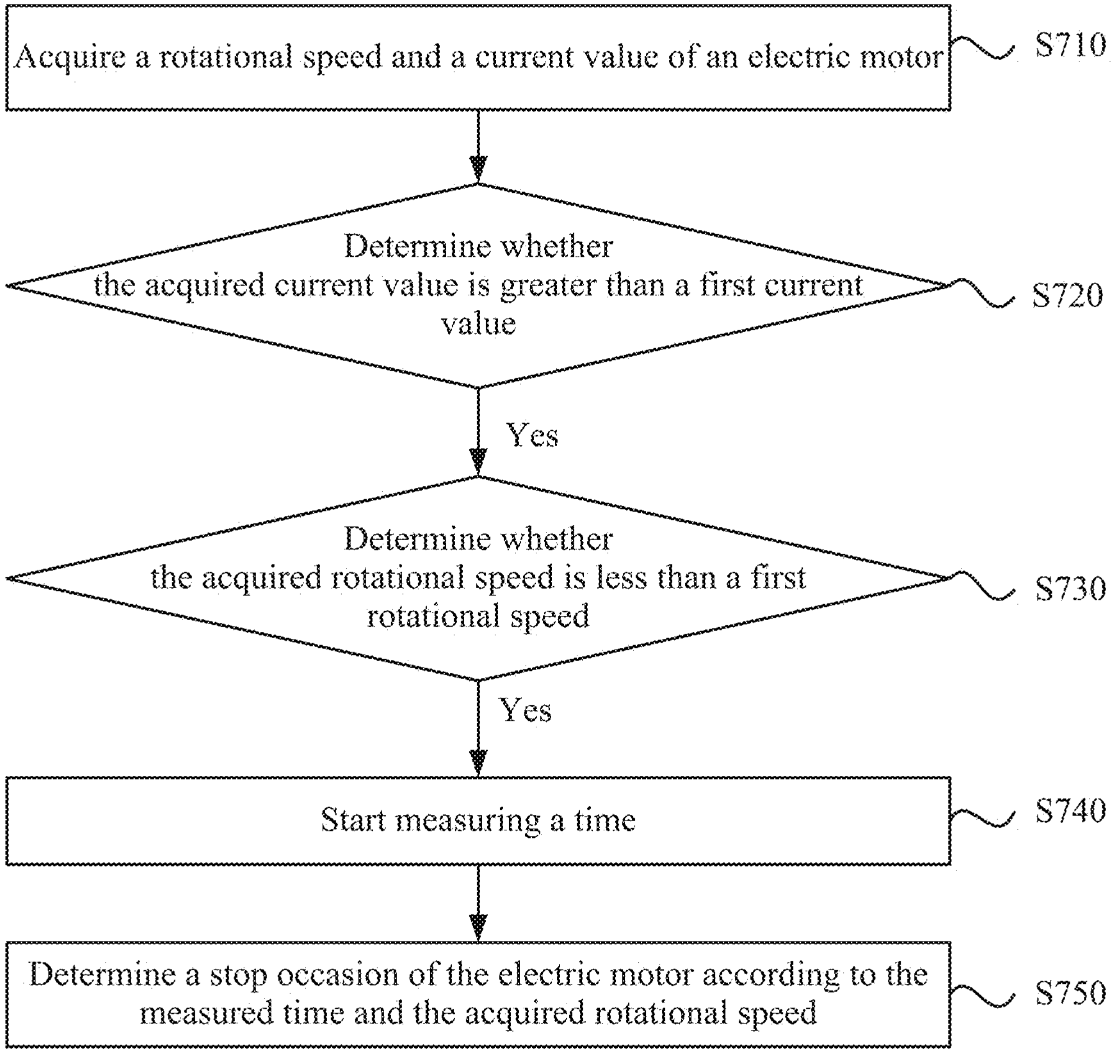
FIG. 12 is another flowchart of a control method of a power tool according to an example of the present application.

FIG. 12 is another flowchart of a control method of a power tool according to an example of the present application. The present application furthers provides the control method of the power tool. As shown in FIG. 12, the method includes the steps below.

In S710, a rotational speed of an electric motor and a current value of the electric motor are acquired.

In S720, it is determined whether the acquired current value is greater than a first current value.

In S730, if yes, it is determined whether the acquired rotational speed is less than a first rotational speed.

In S740, if yes, a time starts to be measured.

In S750, a stop occasion of the electric motor is determined according to the measured time and the acquired rotational speed.

In some examples, determining the stop occasion of the electric motor according to the measured time and the rotational speed includes: determining whether the acquired rotational speed on each occasion is less than a set rotational speed when the measured time reaches a set time; and controlling the electric motor to stop if the acquired rotational speed on each occasion is less than the set rotational speed. The rotational speed here is always greater than zero.

Figure 13:
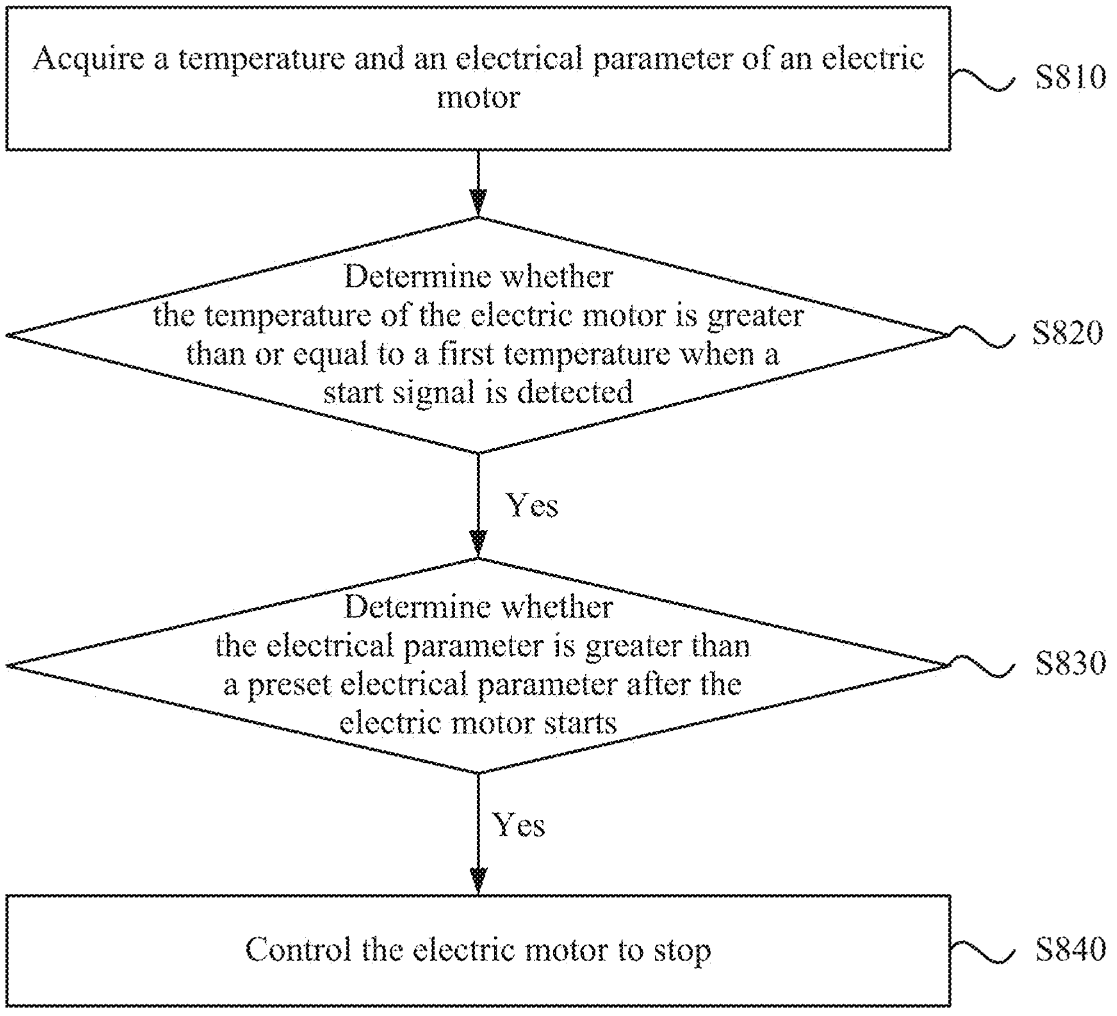
FIG. 13 is another flowchart of a control method of a power tool according to an example of the present application.

In some examples, as shown in FIG. 13, the control method further includes the steps below.

In S810, a temperature of an electric motor and an electrical parameter of the electric motor are acquired.

In S820, it is determined whether the temperature of the electric motor is greater than or equal to a first temperature when a start signal is detected.

In S830, if yes, it is determined whether the electrical parameter is greater than a preset electrical parameter after the electric motor starts.

In some examples, if the temperature of the electric motor is less than the first temperature when the start signal is detected, it is determined whether the acquired temperature of the electric motor is greater than or equal to the third temperature after the electric motor starts. If the acquired temperature of the electric motor is greater than or equal to the third temperature, the electric motor is controlled to stop. The third temperature is greater than the first temperature. In some examples, after the electric motor starts, determining whether the electrical parameter is greater than the preset electrical parameter is stopped if the acquired temperature of the electric motor is less than the second temperature. The second temperature is less than the first temperature.

In S840, if yes, the electric motor is controlled to stop.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A power tool, comprising:

a sensorless, brushless, electric motor comprising a rotor and multi-phase stator windings;

a power supply module configured to supply power to the electric motor and connected to a power supply;

a driver circuit electrically connected to the electric motor and the power supply module and configured to apply a voltage of the power supply module to the electric motor;

a control module electrically connected to the driver circuit and configured to output a control signal to the driver circuit to control the driver circuit; and a detection module electrically connected to the multi-phase stator windings and configured to detect an electrical parameter of each of the multi-phase stator windings during operation of the electric motor;

wherein, during an initial start-up of the electric motor from a stationary state, the electric motor has an unenergized, coasting state in an open-loop control mode, the detection module detects an electrical parameter of each of the multi-phase stator windings of the electric motor in the coasting state, and the control module is configured to control the electric motor to switch from the open-loop control mode to a closed-loop control mode when the electrical parameter detected by the detection module reaches a preset electrical parameter value.

2. The power tool according to claim 1, wherein, in the open-loop control mode, the electric motor can be in a driving state and the coasting state, when the electric motor is in the driving state, the control module controls the power supply to supply power to the multi-phase stator windings, and when the electric motor is in the coasting state, the control module controls the power supply to stop supplying power to the multi-phase stator windings.

3. The power tool according to claim 1, wherein the electrical parameter is one of a voltage, a current, a slope of a voltage, and a derivative of a voltage.

4. The power tool according to claim 1, wherein the control module is configured to output a control signal with a preset duty cycle at a preset frequency to control the multi-phase stator windings to conduct and communicate in a preset commutation sequence.

5. The power tool according to claim 4, wherein the power supply is a battery pack.

6. The power tool according to claim 1, wherein the power supply is an alternating current, and the driver circuit further comprises a rectifier module configured to convert the alternating current into a direct current.

7. The power tool according to claim 1, wherein the control module is configured to: acquire a present load parameter of the electric motor when the electric motor operates in a first mode; and control the electric motor to operate in a second mode and control a duty cycle of a pulse-width modulation signal to decrease to a first duty cycle when the present load parameter meets a first condition, the first duty cycle is less than or equal to a preset duty cycle, and the preset duty cycle is a minimum duty cycle of the pulse-width modulation signal in the second mode.

8. The power tool according to claim 7, wherein the present load parameter is one of a present rotational speed and a present current, when the present load parameter is the present rotational speed, the first condition is that the present rotational speed is less than a first rotational speed, and, when the present load parameter is the present current, the first condition is that the present current is greater than a first current.

9. The power tool according to claim 1, wherein the control module is further configured to: increase a duty cycle of a pulse-width modulation signal at a first preset rate after controlling the duty cycle of the pulse-width modulation signal to decrease to a first duty cycle; and control the duty cycle of the pulse-width modulation signal to decrease to a second duty cycle when a present load parameter meets a second condition.

10. The power tool according to claim 9, wherein the control module is further configured to control the electric motor to operate in a first mode when the present load parameter does not meet the second condition.

11. The power tool according to claim 9, wherein the present load parameter comprises one of a present rotational speed and a present current, when the present load parameter is the present rotational speed, the second condition is that the present rotational speed is less than or equal to a second rotational speed, and, when the present load parameter is the present current, the second condition is that the present current is greater than or equal to a second current.

12. The power tool according to claim 9, wherein the control module is further configured to: increase the duty cycle of the pulse-width modulation signal at a second preset rate after controlling the duty cycle of the pulse-width modulation signal to decrease to the second duty cycle; and control the electric motor to enter a forced commutation state when the present load parameter meets a third condition and self-commutation of the electric motor is not detected within a preset period.

13. The power tool according to claim 12, wherein the control module is further configured to control the electric motor to operate in a first mode when the present load parameter does not meet the third condition.

14. The power tool according to claim 12, wherein the present load parameter is one of a present rotational speed and a present current, when the present load parameter is the present rotational speed, the third condition is that the present rotational speed is less than a third rotational speed, and, when the present load parameter is the present current, the third condition is that the present current is greater than or equal to a third current.

15. A power tool, comprising:

a sensorless, brushless, electric motor comprising a rotor and multi-phase stator windings;

a power supply module configured to supply power to the electric motor and connected to a power supply;

a driver circuit electrically connected to the electric motor and the power supply module and configured to apply a voltage of the power supply module to the electric motor;

a control module electrically connected to the driver circuit and configured to output a control signal to the driver circuit to control the driver circuit and control the electric motor to switch from an open-loop control mode to a closed-loop control mode when variation amplitudes and trends of a modulation terminal voltage and a floating terminal voltage meet preset conditions; and a detection module electrically connected to the multi-phase stator windings and configured to detect an electrical parameter of each of the multi-phase stator windings during operation of the electric motor, detect a terminal voltage of a stator winding that is connected to the power supply and define the terminal voltage as the modulation terminal voltage, and detect a terminal voltage of a stator winding that is not connected to the power supply and define the terminal voltage as the floating terminal voltage.

16. The power tool according to claim 15, wherein the control module is configured to output a control signal with a preset duty cycle at a preset frequency to control the multi-phase stator windings to conduct and commutate in a preset commutation sequence.

17. The power tool according to claim 16, wherein the control module is configured to: acquire a present load parameter of the electric motor when the electric motor operates in a first mode; and control the electric motor to operate in a second mode and control a duty cycle of a pulse-width modulation signal to decrease to a first duty cycle when the present load parameter meets a first condition, the first duty cycle is less than or equal to a preset duty cycle, and the preset duty cycle is a minimum duty cycle of the pulse-width modulation signal in the second mode.

18. The power tool according to claim 17, wherein the control module is further configured to: increase the duty cycle of the pulse-width modulation signal at a first preset rate after controlling the duty cycle of the pulse-width modulation signal to decrease to the first duty cycle; and control the duty cycle of the pulse-width modulation signal to decrease to a second duty cycle when the present load parameter meets a second condition.

19. A control method of a power tool comprising a sensorless, brushless, electric motor comprising a rotor and multi-phase stator windings, a power supply module configured to supply power to the electric motor and connected to a power supply, a driver circuit electrically connected to the electric motor and the power supply module and configured to apply a voltage of the power supply module to the electric motor, a control module electrically connected to the driver circuit and configured to output a control signal to the driver circuit to control the driver circuit, and a detection module electrically connected to the multi-phase stator windings and configured to detect an electrical parameter of each of the multi-phase stator windings during operation of the electric motor, wherein the control method comprises:

upon detection of a start signal for starting the electric motor from a rotational speed of zero, controlling the electric motor to enter an open-loop control mode when a start signal is detected;

detecting, in the open-loop control mode, the electrical parameter of each of the multi-phase stator windings of the electric motor in an unenergized coasting state; and controlling the electric motor to switch from the open-loop control mode to a closed-loop control mode when the electrical parameter reaches a threshold of a preset electrical parameter.

20. The control method according to claim 19, further comprising, when the electric motor operates in a first mode, acquiring a present load parameter of the electric motor, determining whether the present load parameter meets a first condition, and when the present load parameter meets the first condition, controlling the electric motor to operate in a second mode, wherein a duty cycle of a pulse-width modulation signal is controlled to decrease to a first duty cycle, the first duty cycle is less than or equal to a preset duty cycle, and the preset duty cycle is a minimum duty cycle of the pulse-width modulation signal in the second mode.

* * * * *